US008554987B2

(12) United States Patent
So et al.

(10) Patent No.: US 8,554,987 B2
(45) Date of Patent: Oct. 8, 2013

(54) NONVOLATILE MEMORY SYSTEM FOR IMPROVING STREAM DATA WRITING

(75) Inventors: Hirokazu So, Kyoto (JP); Masayuki Toyama, Osaka (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 13/061,731

(22) PCT Filed: May 14, 2010

(86) PCT No.: PCT/JP2010/003268
§ 371 (c)(1),
(2), (4) Date: Mar. 2, 2011

(87) PCT Pub. No.: WO2010/146767
PCT Pub. Date: Dec. 23, 2010

(65) Prior Publication Data
US 2011/0167208 A1 Jul. 7, 2011

(30) Foreign Application Priority Data
Jun. 18, 2009 (JP) .................................. 2009-145613

(51) Int. Cl.
*G06F 12/02* (2006.01)
(52) U.S. Cl.
USPC ......................................... 711/103; 711/170
(58) Field of Classification Search
USPC .......................................................... 711/103
See application file for complete search history.

(56) References Cited

U.S. PATENT DOCUMENTS

| 7,017,825 | B2 * | 3/2006 | Ohya et al. ..................... 235/492 |
| 8,341,375 | B2 * | 12/2012 | So et al. ......................... 711/170 |
| 2006/0129749 | A1 | 6/2006 | Nakanishi et al. |
| 2006/0129750 | A1 | 6/2006 | Lee et al. |
| 2006/0224819 | A1 | 10/2006 | Ito |
| 2007/0067598 | A1 | 3/2007 | Fujimoto |
| 2008/0168252 | A1 * | 7/2008 | Kunimune et al. ............ 711/173 |
| 2008/0250188 | A1 * | 10/2008 | Nakanishi et al. ................. 711/1 |
| 2010/0188883 | A1 * | 7/2010 | Chen et al. ..................... 365/148 |
| 2011/0138117 | A1 * | 6/2011 | Nakamura et al. ............ 711/103 |

FOREIGN PATENT DOCUMENTS

| JP | 07-073098 A | 3/1995 |
| JP | 2001-154909 A | 6/2001 |
| JP | 2006-172458 A | 6/2006 |
| JP | 2010-140268 A | 6/2010 |

OTHER PUBLICATIONS

International Search Report for corresponding International Application No. PCT/JP2010/003268 mailed Jul. 27, 2010.

* cited by examiner

*Primary Examiner* — Jared Rutz
(74) *Attorney, Agent, or Firm* — Renner, Otto, Boisselle & Sklar, LLP

(57) ABSTRACT

The nonvolatile memory device prevents data writing from temporarily slowing down significantly in the middle of writing data to a block when an access device writes all the data in the block in units of a smaller size than the block. The nonvolatile memory device comprises a memory controller including an interface unit configured to receive a first command that identifies a first write range for writing data, and a second command that identifies a second write range that is a part of the first write range and orders to write data to the second write range, an address management unit configured to determine, before data is written into a nonvolatile memory, a new block for writing data to the first write range based on the first command, and a read/write control unit configured to write data to the new block in response to the second command.

19 Claims, 22 Drawing Sheets

| Logical block address | Physical block address for first block | Write flag |
|---|---|---|
| 1 | 32 | False |
| 2 | 126 | False |
| 3 | 790 | False |
| 4 | 55 | True |
| 5 | Unallocated | False |
| ⋮ | ⋮ | ⋮ |
| N | Unallocated | False |

| Registration No. | Logical block address | Physical block address for second block | Write state | | ... |
| --- | --- | --- | --- | --- | --- |
| | | | Mode | Number of written pages | |
| 1 | 282 | 922 | Sequential | 4 | ... |
| 2 | 776 | 8 | Sequential | 64 | ... |
| 3 | 27 | 393 | Random | 32 | ... |
| 4 | Unregistered | Unregistered | Unregistered | Unregistered | ... |

| Physical block address | State |
|---|---|
| 1 | Unoccupied |
| 2 | Occupied |
| 3 | Occupied |
| 4 | Unoccupied |
| 5 | Occupied |
| ⋮ | ⋮ |
| M | Occupied |

FIG. 7

(Before preparation process for second block)

Logical block X

Copying valid data (After preparation process for second block)

Logical block X

| Stream number | Logical block address | Write state | |
|---|---|---|---|
| | | Number of written pages | ... |
| 1 | 12 | 2 | ... |
| 2 | 76 | 0 | ... |
| 3 | 2 | 6 | ... |
| 4 | 44 | 16 | ... |

NONVOLATILE MEMORY SYSTEM FOR IMPROVING STREAM DATA WRITING

FIELD OF INVENTION

The present invention relates to a nonvolatile memory device such as a semiconductor memory card having a nonvolatile memory and a memory controller that controls the nonvolatile memory. The present invention also relates to an access device that accesses such a nonvolatile memory device, a nonvolatile memory system that includes such a nonvolatile memory device and an access device, and a memory controller.

BACKGROUND ART

There is an increase in demand for nonvolatile memory devices, such as semiconductor memory cards, having rewritable nonvolatile memories. In general, semiconductor memory cards are more expensive than optical disks, tape media and other similar media. Semiconductor memory cards, however, have many advantages such as small-size, lightweight, earthquake-proof, and easy to use. Therefore, the demand for semiconductor memory cards has been increasing as recording media for mobile devices such as digital still cameras and mobile phones. Also, semiconductor memory devices are recently being used as recording media for moving picture recorders for consumer use, moving picture recorders used in a broadcast station or for professional use, and other similar devices. In addition to these, not only portable devices, but also stationary devices such as digital TV sets or DVD recorders include slots for semiconductor memory cards as standard.

These types of semiconductor memory cards include a flash memory as a nonvolatile main memory and a memory controller for controlling the main memory. The memory controller controls the flash memory for reading or writing data in accordance with a read command and a write command received from an access device such as a digital still camera.

In recent years, there is an increase in demand for larger capacities for flash memories used for semiconductor memory cards. This is because semiconductor memories need to adapt to and store high quality AV contents including still images and moving images, each of which has a larger data size than before. As a result, the size of a block, which is a constituent of a flash memory and the unit by which data is erased, is increasing.

Furthermore, the access device uses a file system to control the memory area of a semiconductor memory card. In general, the unit used by the file system, which is called a "cluster", has a smaller size than the above-mentioned block so that the memory area can be used with as little unused area as possible. Therefore, when a single cluster is to be rewritten, the whole block needs to be rewritten, which significantly slows down the data writing. One known memory controller holds down frequent writings to the whole block and prevents the data writing from slowing down, as described in Patent Citation 1.

According to this known technique, plural blocks, each of which is the unit for erasing data, are divided into a first block group, a second block group, and a spare block group. When first blocks included in the first block group are requested to be written to but found to be filled up with data so that additional data cannot be written thereto, second blocks included in the second block group are used as extended blocks of the first blocks. In this case, only the updated pieces of the data stored in the first blocks are written to the second blocks. When all the second blocks are then filled up and no more data can be added, spare blocks in the spare block group are used such that only valid data of the first and second blocks are organized and written to the spare blocks, and then the original data in the first and second blocks from which the data has been copied into the spare blocks is erased to change the first and second blocks into new spare blocks and unoccupied second blocks respectively. This decreases the number of times for rewriting the whole block and prevents the data writing from slowing down.

Patent Citation 1: JP2001-154909

DISCLOSURE OF INVENTION

Problems to be Solved by Invention

However, in the above-mentioned method, the data writing inevitably slows down temporarily, but significantly, when the valid data of the first and second blocks are organized and written to the spare blocks. Furthermore, the time when the data writing slows down in this manner can be recognized by a memory controller that controls the flash memory, but not by an access device for the semiconductor memory card. This makes it difficult to design an access device such as a moving image recorder that requires a constant writing speed.

Furthermore, the data having a larger size than a single block needs to be updated when the access device writes large volumes of content data (hereinafter referred to as "stream data") such as moving images. Even when all the data in a block are to be updated, the access device writes the data on a cluster-by-cluster basis. Therefore, the memory controller has no way of knowing in advance that all the data in the block is going to be updated. Suppose the second block is partially written and all the data in the second block are now required to be updated. In this case, the above-mentioned conventional memory controller, which is unaware of the fact that all the data in the block are to be rewritten in the end, writes data to the unwritten part of the second block while keeping the original data previously written to the first and second blocks. As a result, this necessitates the above-mentioned data organizing procedure during the writing of the data of a single block size, which temporarily slows down the writing significantly.

The present invention has been achieved to solve the above-mentioned problems and aims to provide a nonvolatile memory device, an access device, a nonvolatile memory system, or a memory controller that prevents data writing from temporarily slowing down significantly when the access device writes all the data in a block in units of a smaller size than the block.

Means for Solving Problems

A first aspect of the present invention provides a nonvolatile memory device comprising a nonvolatile memory and a memory controller configured to control data writing and reading with respect to the nonvolatile memory. The memory controller includes an interface unit, an address management unit, and a read/write control unit.

The interface unit receives a first command that identifies a first write range for writing data, and a second command that identifies a second write range that is a part of the first write range and orders to write data to the second write range.

The address management unit determines, before data is written into the nonvolatile memory, a new block for writing data to the first write range based on the first command.

The read/write control unit writes data to the new block in response to the second command.

The "first write range" may be a range obtained by dividing a logical space, which is allocated to the access device by the nonvolatile memory device for data writing and reading, into sections which correspond to the unit of block. The "second write range" may be a range equivalent to a unit for writing data by the access device. The "block" may be a physical block arranged in the nonvolatile memory.

According to the nonvolatile memory device, a new block for writing data to the first write range is determined based on the first command before data is written into the nonvolatile memory, and the data is written to the new block in response to the second command. This reduces the number of times for rewriting blocks in the middle of data writing, so that it prevents the data writing from temporarily slowing down significantly even when large volumes of data such as stream data are to be continuously written.

A second aspect of the present invention provides a nonvolatile memory device comprising a nonvolatile memory and a memory controller configured to control data writing and reading with respect to the nonvolatile memory. The memory controller includes an interface unit, an address management unit, and a read/write control unit.

The interface unit receives a first command that indicates data writing, and a second command that orders the data writing.

The address management unit determines, before data is written into the nonvolatile memory, a new block for writing data based on the second command that is received subsequent to the first command by the interface unit.

The read/write control unit writes data to the new block in response to the second command received by the interface unit.

The second command that is received subsequent to the first command by the interface unit includes information that identifies a first write range for writing data and information that identifies a second write range that is a part of the first write range. The second command orders to write data to the second write range.

According to the nonvolatile memory device, a new block is determined based on the second command that orders actual data writing. Therefore, even when the writing of large volumes of data based on the first command is stopped in the middle of writing, the kept data is not abandoned but held until the second command is received.

A third aspect of the present invention provides, in addition to the first or second aspect, a nonvolatile memory device in which the address management unit determines, before determining the new block, whether one or more block has been determined with respect to the first write range, and abandons the one or more block when the one or more block has been determined with respect to the first write range.

Here, abandoning a block may mean to change a block which has been allocated to the first write range into an unallocated state, and to treat that block as a logically unoccupied block. In this case, the actual data remaining in the unallocated block may be erased, or alternatively may be left until new data is written to that block. In other words, the remaining data may be in any state and may not be normal.

A fourth aspect of the present invention provides, in addition to the first or second aspect, a nonvolatile memory device in which the address management unit determines, before determining the new block, whether one or more block has been determined with respect to the first write range, and erases the one or more block when the one or more block has been determined with respect to the first write range.

Erasing a block may mean to put a block into such a state that only dummy data (for example, all the bits are 0 or 1) are read from the block.

According to the nonvolatile memory device, it is determined whether one or more block has been determined with respect to the first write range before the new block is determined and, according to the determination, the one or more block is abandoned or all the data therein are erased. Therefore, this enables a more secure determination of a new block.

A fifth aspect of the present invention provides, in addition to the first or second aspect, a nonvolatile memory device in which the first write range is an integer multiple of the second write range.

A sixth aspect of the present invention provides, in addition to the first aspect, a nonvolatile memory device in which the first command includes first identification information for identifying the first write range.

The "identification information" may be address information that identifies the first write range.

A seventh aspect of the present invention provides, in addition to the first or the second aspect, a nonvolatile memory device in which the first command includes at least one piece of second identification information for identifying stream data.

An eighth aspect of the present invention provides, in addition to the seventh aspect, a nonvolatile memory device in which the address management unit determines the new block for each piece of the second identification information.

According to the nonvolatile memory device, a new block is determined based on a larger write range. This enables reduction in amount of address information to be managed, thereby saving memory resources.

A ninth aspect of the present invention provides, in addition to the eighth aspect, a nonvolatile memory device in which the address management unit stores plural pieces of the second identification information, and the read/write control unit writes data to plural new blocks corresponding to the plural pieces of the second identification information in a parallel manner.

The device is capable of writing plural pieces of data of large volumes, which are transmitted in parallel, efficiently at high speeds.

A tenth aspect of the present invention provides an access device that writes and reads data to and from a nonvolatile memory device. The access device transmits to the nonvolatile memory device a first command that includes identification information for identifying a first write range for writing data. After transmitting the first command, the access device transmits to the nonvolatile memory device plural second commands. Each of the second commands includes identification information for identifying a second write range that is a part of the first write range and orders to write data to the second write range.

The access device transmits to the nonvolatile memory device the plural second commands each including identification information for identifying the second write range that is a part of the first write range, after transmitting the first command that includes identification information for identifying the first write range.

According to the access device, even when large volumes of data such as stream data are to be written continuously, the number of times for rewriting blocks in the middle of writing data by the nonvolatile memory device is reduced so that it prevents the data writing from temporarily slowing down significantly.

An eleventh aspect of the present invention provides an access device that writes and reads data to and from a nonvolatile memory device. The access device transmits to the nonvolatile memory device a first command that indicates data writing. After transmitting the first command, the access device transmits to the nonvolatile memory device plural second commands, each of which orders to write data. The second command that is transmitted subsequent to the first command includes information that identifies a first write range for writing data and information that identifies a second write range that is a part of the first write range. The second command orders to write data to the second write range.

An twelfth aspect of the present invention provides a nonvolatile memory system comprising the nonvolatile memory device according to any one of the first to ninth aspects of the present invention, and the access device according to the tenth or eleventh aspect of the present invention.

A thirteenth aspect of the present invention provides a memory controller that controls data writing and reading to and from a nonvolatile memory and comprises an interface unit, an address management unit and a read/write control unit.

The interface unit receives a first command that identifies a first write range for writing data, and a second command that identifies a second write range that is a part of the first write range and orders to write data to the second write range.

The address management unit determines, before data is written into the nonvolatile memory, a new block for writing data to the first write range based on the first command.

The read/write control unit writes data to the new block in response to the second command.

A fourteenth aspect of the present invention provides a memory controller that controls data writing and reading to and from a nonvolatile memory and comprises an interface unit, an address management unit and a read/write control unit.

The interface unit receives a first command that indicates data writing, and a second command that orders the data writing.

The address management unit determines, before data is written into the nonvolatile memory, a new block for writing data based on the second command that is received subsequent to the first command by the interface unit.

The read/write control unit writes data to the new block in response to the second command received by the interface unit.

The second command that is received subsequent to the first command by the interface unit includes information that identifies a first write range for writing data and information that identifies a second write range that is a part of the first write range. The second command orders to write data to the second write range.

Effects of Invention

According to the present invention, it is possible to prevent data writing from temporarily slowing down significantly when the access device writes all the data in a block in units of a smaller size than the block.

Therefore, it is possible to provide a nonvolatile memory device, an access device, a nonvolatile memory system, or a memory controller that is capable of writing large volumes of content data such as stream data while maintaining a stable writing speed.

BRIEF DESCRIPTION OF DRAWINGS

FIG. 5 shows a first logical/physical conversion table in the first embodiment;

FIG. 6 shows a second logical/physical conversion table in the first embodiment;

FIG. 7 is an unoccupied block management table in the first embodiment;

EMBODIMENTS OF INVENTION

Embodiments of the present invention will be described below with reference to the accompanying drawings First Embodiment <1. Configuration of Nonvolatile Memory System 1>

Figure 1:
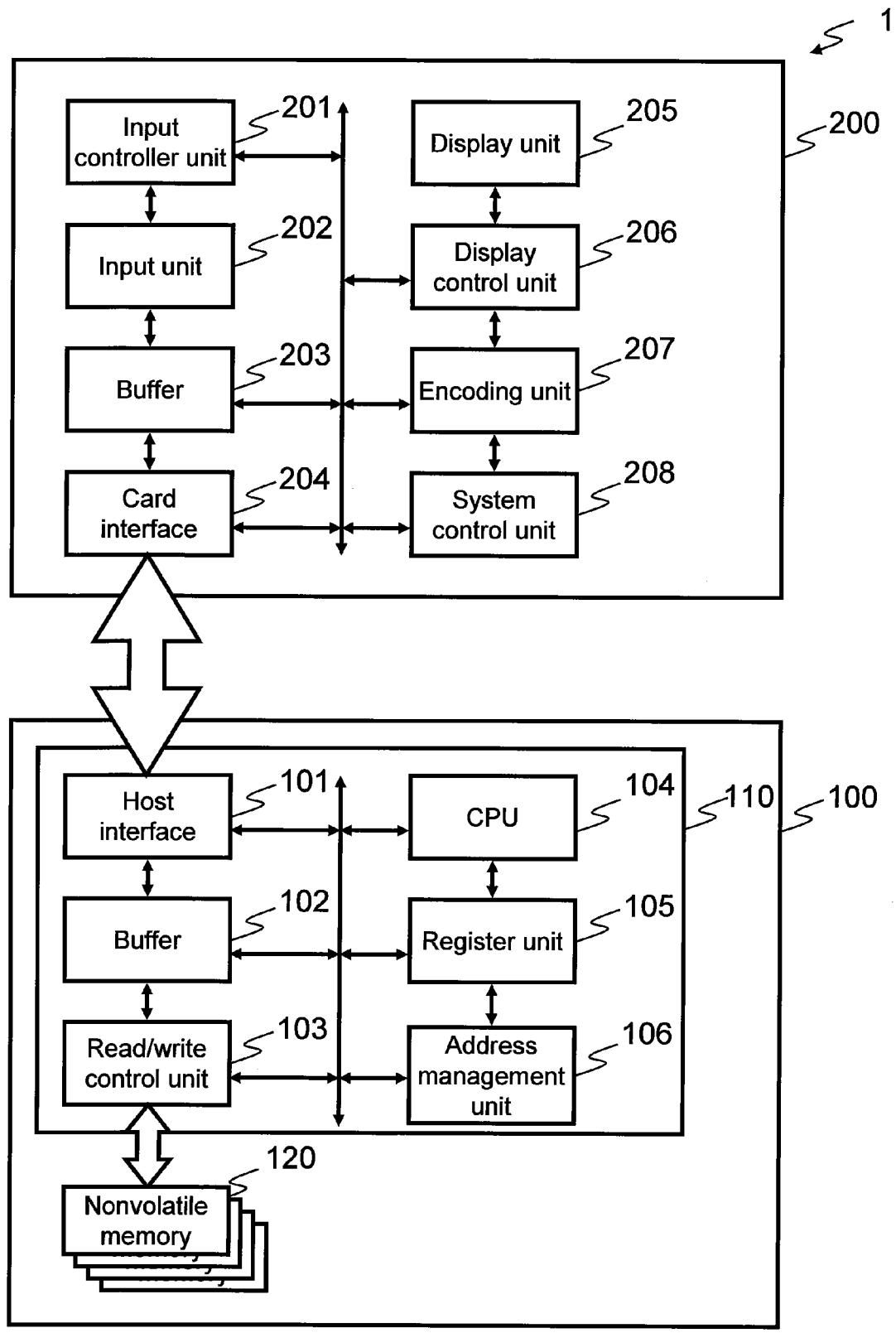
FIG. 1 is a block diagram showing a nonvolatile memory system according to a first embodiment of the present invention.

FIG. 1 shows a configuration of a nonvolatile memory system 1 according to the first embodiment of the present invention.

The nonvolatile memory system 1 of this embodiment includes a nonvolatile memory device 100, and an access device 200 to which the nonvolatile memory device 100 is attached.

<1.1 Configuration of Access Device 200>

The access device 200 includes an input controller unit 201, an input unit 202, a buffer 203, a card interface (card IF) 204, a display unit 205, a display control unit 206, an encoding unit 207, and a system control unit 208. The access device 200 is, for example, a moving image recorder such as a video camera.

The input unit 202 is a unit for inputting stream data such as moving images and is controlled by the input control unit 201.

The buffer 203, which is comprised of RAM or the like, is a unit for temporarily storing the stream data input from the input unit 202.

The card IF 204 accesses the nonvolatile memory device 100 for reading and writing data.

The display unit 205 displays information concerning the nonvolatile memory system 1 and is controlled by the display control unit 206.

The encoding unit 207 encodes the stream data stored in the buffer 203.

The system control unit 208, which includes therein a ROM for programs and a RAM for operations, controls the whole access device 200.

The stream data input from the input unit 202 are temporarily stored in the buffer 203 and encoded by the encoding unit 207. Then, the encoded stream data are written to the nonvolatile memory device 100 via the card IF 204.

<1.2. Configuration of Nonvolatile Memory Device 100>

The nonvolatile memory device 100 includes a memory controller 110 and a nonvolatile memory 120 comprised of a flash memory.

<1.2.1. Memory Controller 110>

The memory controller 110 includes a host interface (Host IF) 101 that communicates with the access device 200, a buffer 102, a read/write control unit 103, a CPU 104, a register unit 105, and an address management unit 106.

The buffer 102, which is comprised of RAMs or the like, temporarily stores data transferred from the access device 200 or data read from the nonvolatile memory 120. The data transfer between the access device 200 and the memory controller 110 differs from the data transfer between the memory controller 110 and the nonvolatile memory 120 in the units and the timing. The buffer 102 is used for buffering such differences.

The read/write control unit 103 writes to the nonvolatile memory 120 the data temporarily stored in the buffer 102 based on the physical addresses designated by the address management unit 106. The read/write control unit 103 reads data from the nonvolatile memory 120 and temporarily stores the data in the buffer 102.

The CPU 104, which includes therein a ROM for programs and a RAM for operations, controls the whole memory controller 110.

The register unit 105 stores various pieces of parameter information relating to the nonvolatile memory device 100.

The address management unit 106 converts logical addresses transferred from the access device 200 into physical addresses in the nonvolatile memory 120 and controls, for example, the states of data storage in the nonvolatile memory 120.

The address management unit 106 according to this embodiment generates a first logical/physical conversion table 131 (see FIG. 5), a second logical/physical conversion table 132 (see FIG. 6), and an unoccupied block management table 140 (see FIG. 7) in RAM and use them, as will be discussed later in greater detail.

<1.2.2. Nonvolatile Memory 120>

Figure 2:
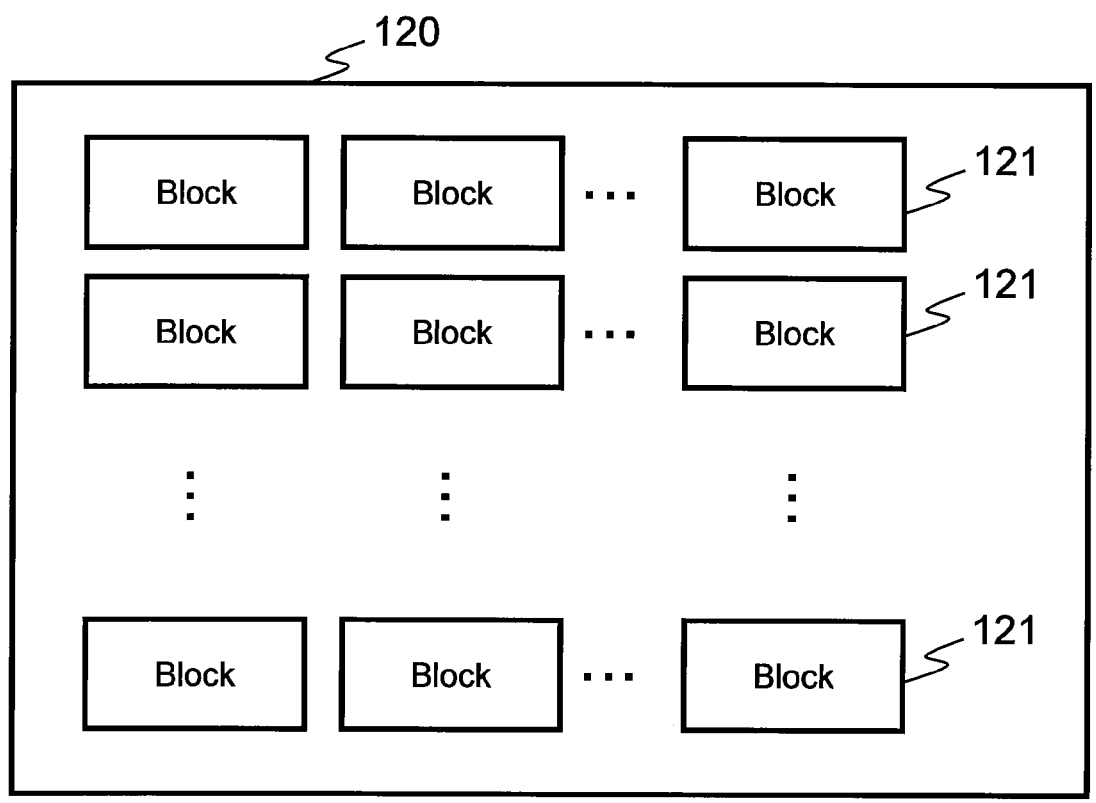
FIG. 2 is a diagram illustrating a relationship between a flash memory and blocks.

As illustrated in FIG. 2, the nonvolatile memory 120, as a flash memory, is comprised of blocks 121. Each block 121 is a unit for erasing data in the flash memory.

Figure 3:
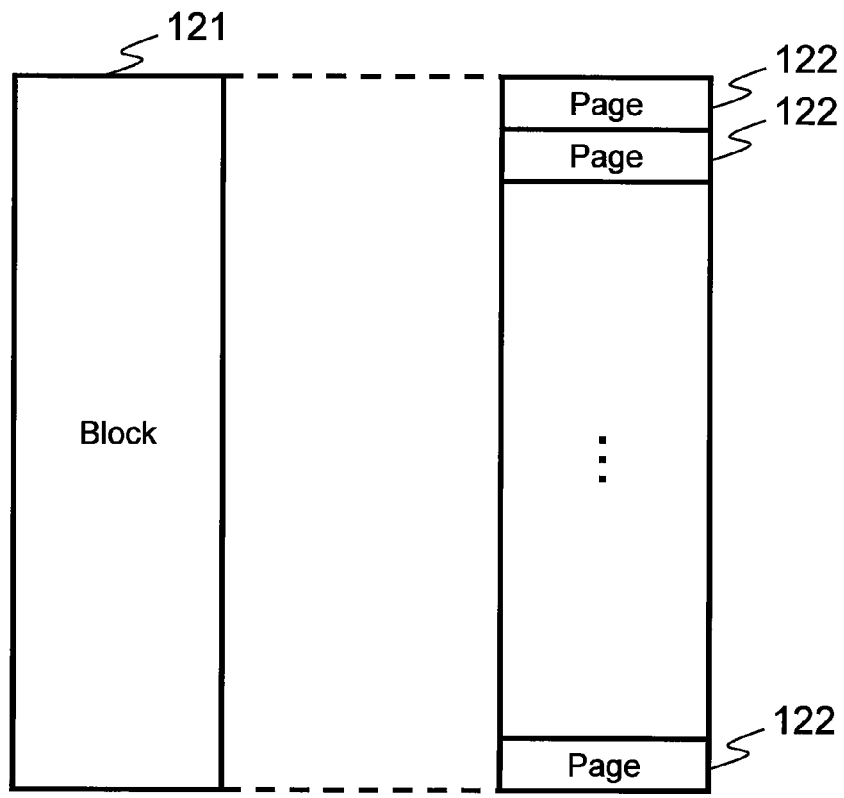
FIG. 3 is a diagram illustrating a relationship between a block and pages.

As shown in FIG. 3, each block 121 is comprised of plural pages 122. Each page 122 is a unit for writing data in the flash memory. Data is always written to the block 121 in the order of page, from its physically first page to the subsequent pages.

Figure 4:
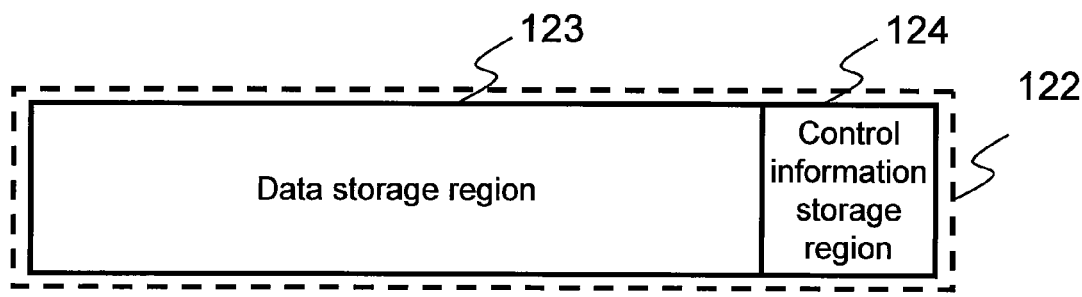
FIG. 4 is a diagram illustrating the structure of a page.

As shown in FIG. 4, each page 122 includes a data storage region 123 for storing, for example, data transferred from the access device 200 and a control information storage region 124 for storing control information used by the memory controller 110. The control information storage region 124 stores logical address information for each page of the data stored in the data storage region 123, and information such as error-correcting codes.

<1.2.3. Tables in Address Management Unit 106>

The address management unit 106 includes a first logical/physical conversion table 131 and a second logical/physical conversion table 132 for managing the corresponding relationship between logical addresses and physical addresses for each block.

<<First Logical/Physical Conversion Table 131>>

FIG. 5 shows a configuration example of the first logical/physical conversion table 131. The logical/physical conversion table 131 establishes a one to one correspondence between logical blocks and physical blocks: the logical blocks obtained by dividing—into blocks—a logical space for data writing and reading provided to the access device 200 by the nonvolatile memory device 100; and the physical blocks are physical blocks provided in the nonvolatile memory 120. Hereinafter, a physical block registered in the first logical/physical conversion table 131 will be called a "first block".

As one of the characteristics of the present embodiment, the first logical/physical conversion table 131 includes a write flag. The write flag sets a binary value, i.e. true or false, as information indicating whether data can be added to the first block. When the write flag is false, the first block may have been filled up with written data or may be unallocated. When the write flag is true, the first block has unwritten pages.

<<Second Logical/Physical Conversion Table 132>>

FIG. 6 shows a configuration example of the second logical/physical conversion table 132. In the second logical/physical conversion table 132, physical blocks other than the first blocks are allocated to specific logical blocks. Hereinafter, a physical block registered in the second logical/physical conversion table 132 will be called a "second block".

The second block is a block to be used for updating data when the one-block-sized data written to the first block is to be partly updated. The smallest unit for such update is a page, i.e. the unit for writing data to a block. In this embodiment, the second block can be registered in the second logical/physical conversion table 132 only when the write flag of the first block is set to false (i.e. the first block is not writable) in the first logical/physical conversion table 131.

In the example illustrated in FIG. 6, second blocks can be allocated to up to four respective logical blocks. The number of logical blocks to which second blocks can be allocated may be changed according to the design of the nonvolatile memory device 100. An increase in the number of second blocks prevents more effectively data writing from slowing down when random data writing to logical addresses occurs. This is because the probability of writing to the second blocks is higher with such random data writing. In this case, however, because blocks other than the first blocks need to be allocated, the number of second blocks should be limited to some extent in order to ensure that a certain amount of logical space can be provided to the access device 200 by the nonvolatile memory device 100.

The second logical/physical conversion table 132 may include information for managing write states of the second blocks. As illustrated in FIG. 6, for example, the second logical/physical conversion table 132 may include the number of written pages in each second block and information indicating whether the logical address of written data is sequential or random. Alternatively, these pieces of information may be obtained or prepared through a read-out from the control information storage region 122 included in a written page of a second block. In this embodiment, however, these pieces of information are stored as a part of the second logical/physical conversion table 132 held in a RAM, which helps to achieve higher speed writing.

The address management unit 106 further includes an unoccupied block management table 140 for managing the states of use of each physical block.

FIG. 7 shows a configuration example of an unoccupied block management table 140. The unoccupied block management table 140 keeps information indicating whether each of the physical blocks in the nonvolatile memory 120 is unoccupied or occupied. An "unoccupied" block is a physical block that has no valid data and is capable of storing new data. An "occupied" block, which is a block other than the unoccupied block, may be a first block registered in the first logical/physical conversion table 131, a second block registered in the second logical/physical conversion table 132, a block that stores system information to be used in the memory controller 110 (hereinafter, called a "system information block"), or a defective block to which data cannot be written to.

<1.3. Management of Logical Space by Access Device 200>
<1.3.1. Outline of Management of Logical Space>

Next, how the access device 200 manages a logical space provided by the nonvolatile memory device 100 will be discussed.

Figure 8:
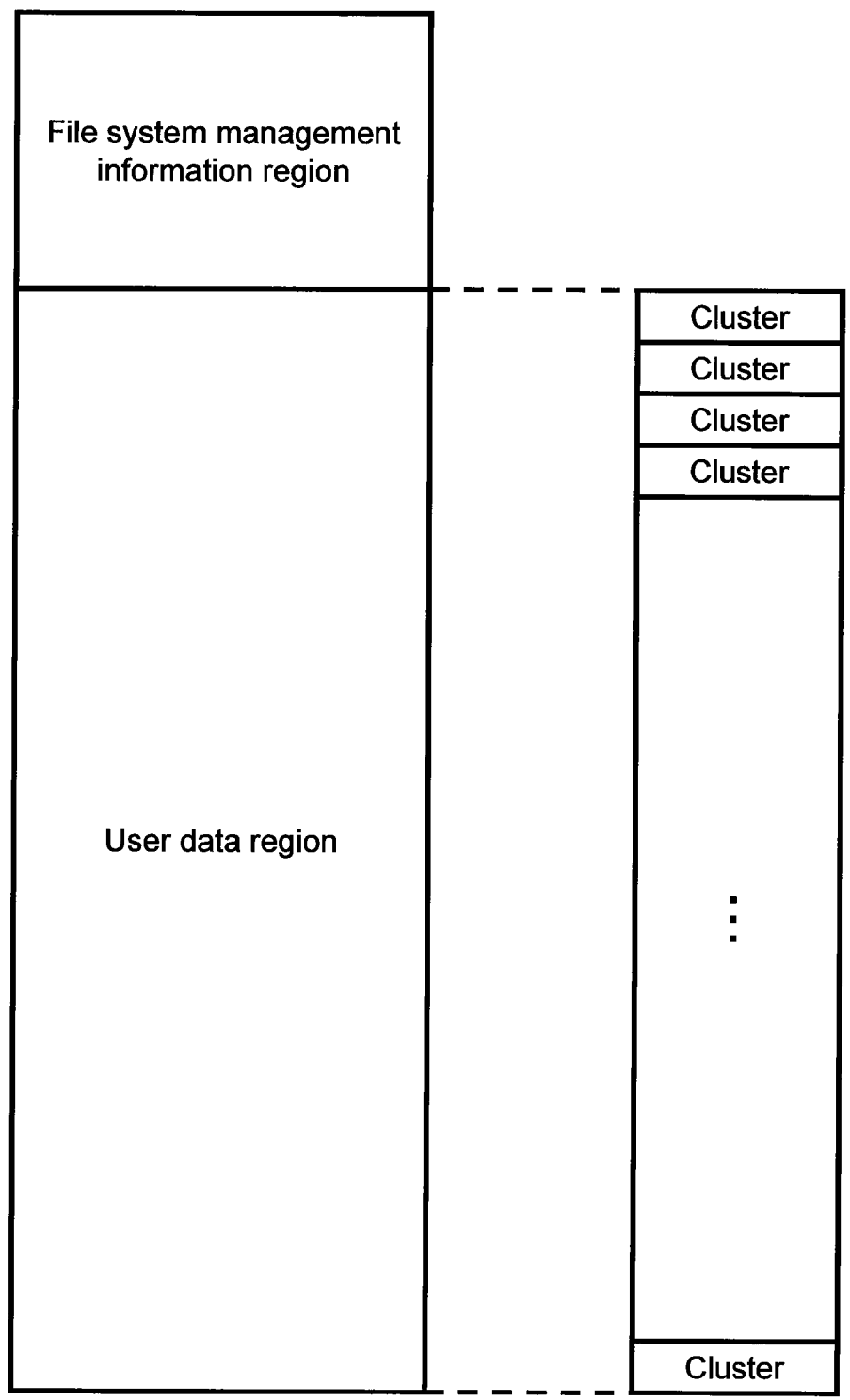
FIG. 8 is a diagram for illustrating how the logical space is managed by a file system.

The access device 200 according to this embodiment manages the logical space using a FAT file system. There are various types of FAT file systems, such as FAT 12, FAT 16, FAT 32 and exFAT. Every type of the FAT file systems is composed of a file system management information region for storing management information for the file system and a user data region for storing user data such as stream data, as shown in FIG. 8. The user data region is divided into the units called "clusters" for management. The data having a larger volume than the size of a cluster is divided and stored separately in plural clusters. Link information is provided for indicating the links between clusters and is stored in the file system management information region.

Figure 9:
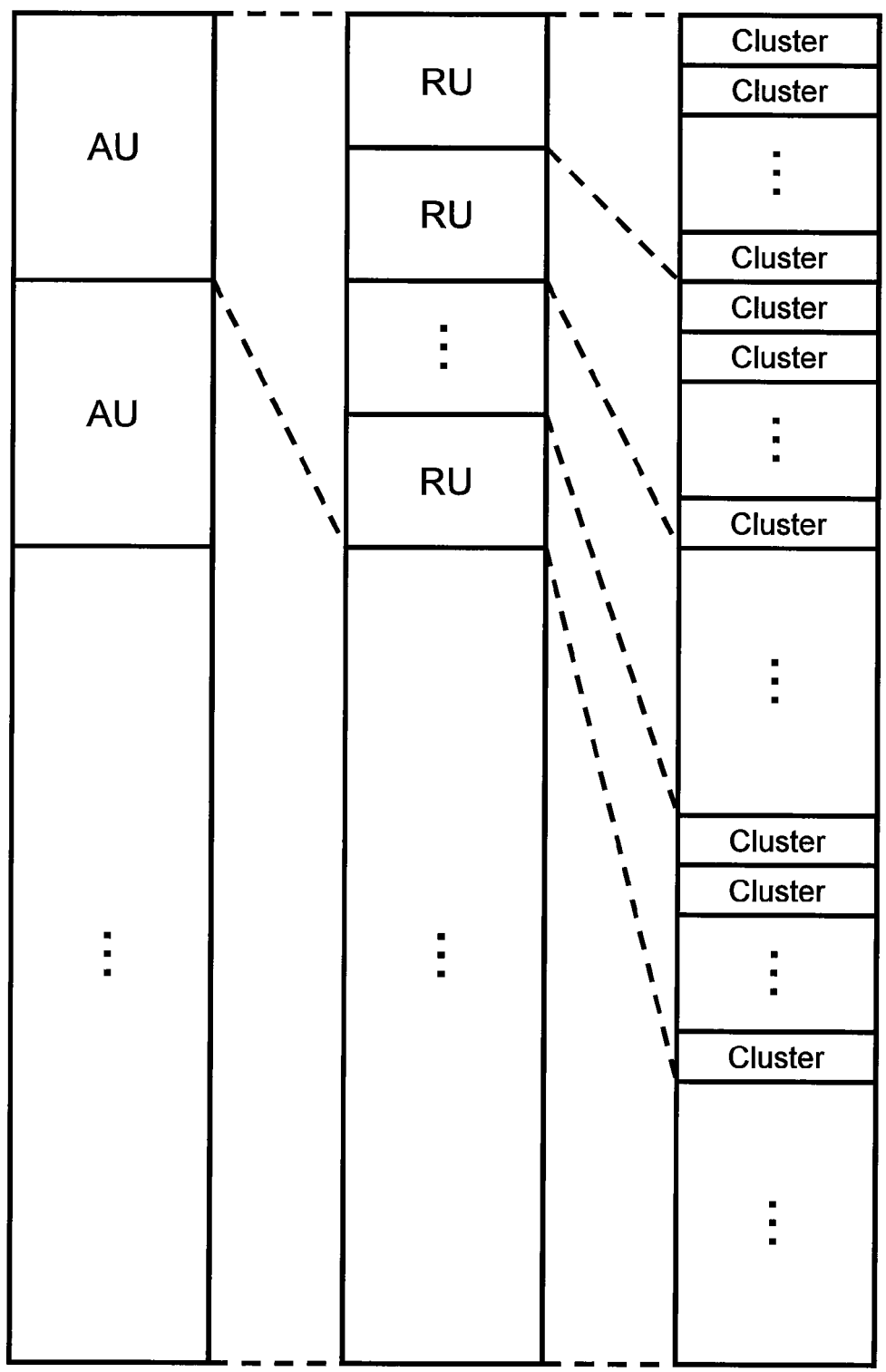
FIG. 9 is a diagram illustrating a relationship between AUs, RUs and clusters.

In other words, the cluster is a basic unit for data writing by the access unit 200. For writing stream data, however, an RU (Recording Unit) composed of plural clusters having sequential logical addresses is used as a basic unit, as shown in FIG. 9. This enables reduction in overhead that is caused by write commands successively generated by the nonvolatile memory device 100 when large volumes of stream data are being written.

The access device 200 designates an address for writing stream data, which is incremented in order within the unit of an AU (Allocation Unit) shown in FIG. 9 that is an integer multiplication of the RU. Because the AU has a size equal to an integer multiplication of the logical block, stream data is able to be written to the logical block continuously from its very first address, which enables the memory controller 110 of the nonvolatile memory device 100 to effectively write the stream data into the nonvolatile memory 120. In this embodiment, the AU has a size equal to a logical block.

FIG. 9 illustrates a relationship between the AU, the RU, and the cluster.

<1.3.2. Command Format>

The nonvolatile memory device 100 processes at least four commands transferred from the access device 200.

The "write command" (second command) is a command for writing data to the nonvolatile memory 120. The "read command" is a command for reading the data stored in the nonvolatile memory 120 and transferring the data to the access device 200. The "initialization command" is a command for an initialization process to start reading and writing from and to the nonvolatile memory device 100. The "stream data writing control command" is a command for controlling the writing of stream data.

Figure 10:
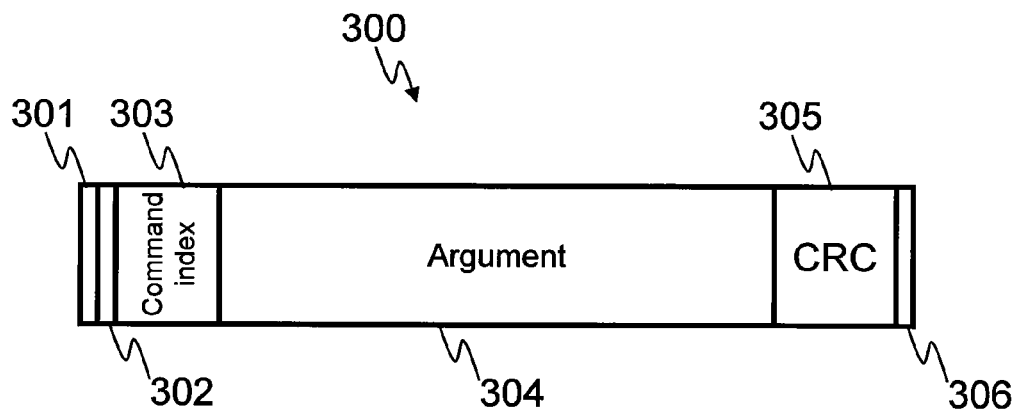
FIG. 10 shows a command format in the first embodiment.

FIG. 10 shows an example of a format for these commands. In the illustrated example of FIG. 10, the command 300 is comprised of a start bit 301 (1 bit) for indicating the start of the command, a command flag 302 (1 bit) for indicating that it is a command, a command index 303 (6 bits) for indicating a type of the command, an argument 304 (32 bits) for setting a parameter according to the type of the command, a CRC 305 (7 bits) for detecting an error during transfer of the command, and an end bit 306 (1 bit) for indicating the end of the command. The command is therefore composed of 48 bits, i.e. 6 bytes.

The write command stores, in the argument 304, a logical address for the start of writing for each sector (512 bytes).

The read command stores, in the argument 304, a logical address for the start of reading for each sector (512 bytes).

Figure 11:
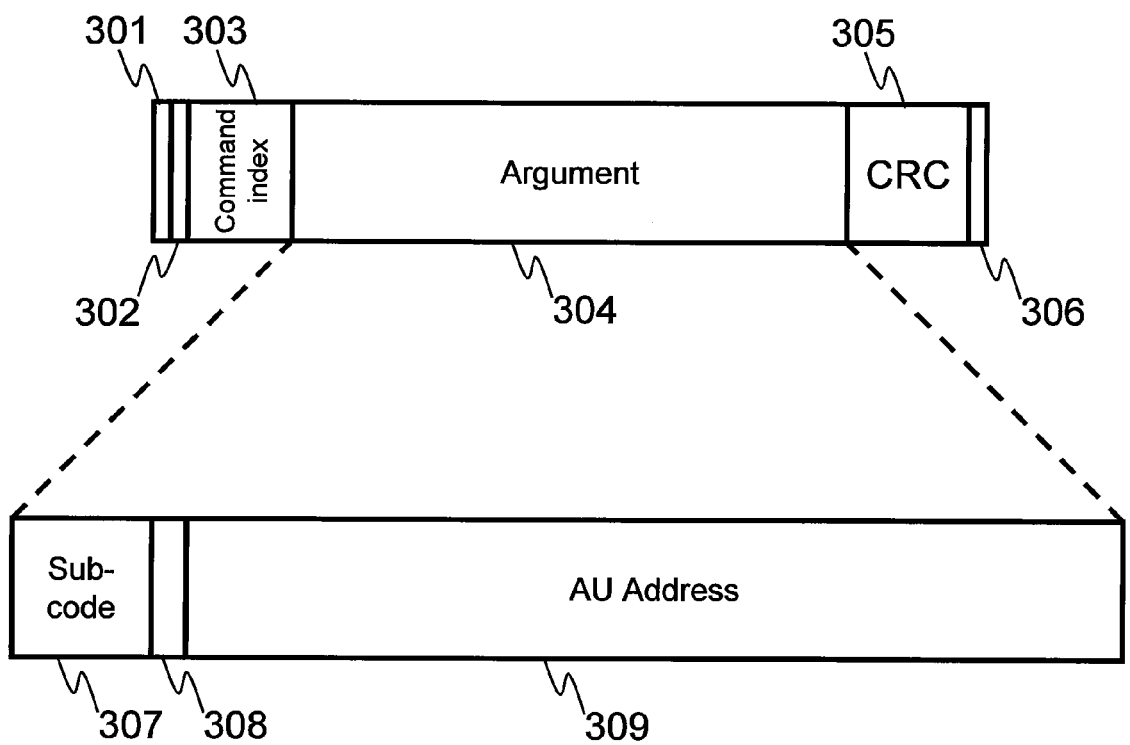
FIG. 11 shows a format of a stream data writing preparation command in the first embodiment.

For the stream data writing control command, as shown in FIG. 11, the control to be executed can be extended by a sub-code 307 (4 bits) provided in the argument 304, and at least the "AU designation for writing" is defined, which is a sub-code for designating the AU for writing stream data.

Hereinafter, the stream data writing control command which includes a sub-code storing therein an AU designation for writing is called a "stream data writing preparation command" ("first command").

FIG. 11 shows a concrete example of the format of the stream data writing preparation command. The argument 304 in the stream data writing preparation command is comprised of a sub-code 307 (4 bits) indicating an AU designation for writing, a spare bit 308 (1 bit) for prospective extension, and an AU address 309 (27 bits) that is an AU address for writing stream data.

The write command or the read command is capable of indicating a logical address of 32 bits for each sector, which results in a logical space of a maximum of 2 TB (terabytes) in total. The AU address is expressed using 27 bits, which would result in a logical space for management not less than 2 TB if the size of each AU is equal to or more than 16 kilo bytes.

<1.4. Operation of Nonvolatile Memory Device 100>

First, the operation of the nonvolatile memory device 100 will be discussed.

<1.4.1. Initialization Process>

Figure 12:
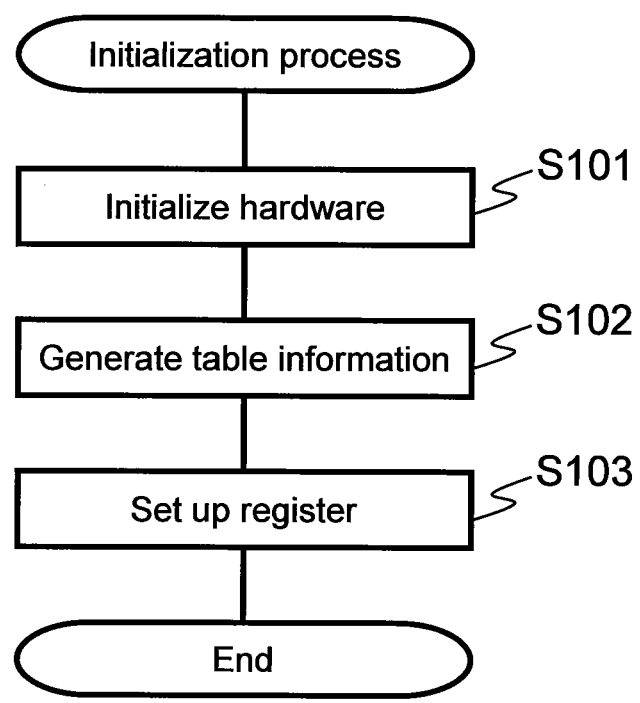
FIG. 12 is a flowchart illustrating the process when an initialization command is received by a nonvolatile memory device according to the first embodiment.

FIG. 12 is a flowchart illustrating the process when an initialization command is received by the nonvolatile memory controller 110.

<<Steps S101-S103>>

After the nonvolatile memory device 100 is powered on, the memory controller 110 initializes the hardware to put the memory controller 110 into a state capable of receiving a command. Then, the memory controller 110 receives the "initialization command" from the access device 200 and then performs some hardware initialization process required for starting the access to the nonvolatile memory 120.

Then, the memory controller 110 accesses the nonvolatile memory 120 using the read/write control unit 103 and read data from a system information block in the nonvolatile memory 120 where the system information for address management is stored. The memory controller 110 then generates the first logical/physical conversion table 131, the second logical/physical conversion table 132, the unoccupied block management table 140, and the like in the address management unit 106 (S102).

Furthermore, various parameters are set in the register unit 105 based on the information stored in the system information block or a ROM of the CPU 104. The parameter information includes at least the size information for an AU.

<1.4.2. Preparation Process for Stream Writing>

Figure 13:
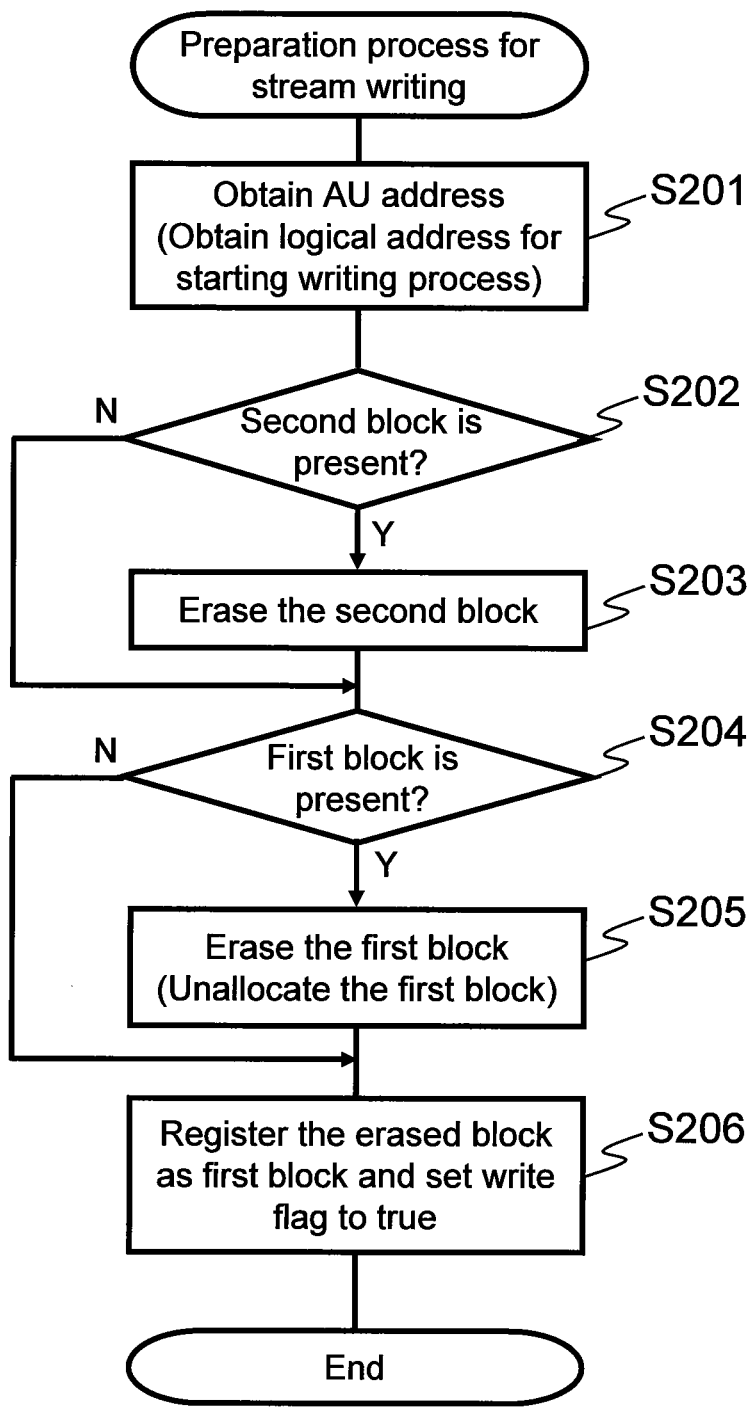
FIG. 13 is a flowchart illustrating the process when a stream data writing preparation command is received by the nonvolatile memory device according to the first embodiment.

FIG. 13 is a flowchart illustrating the process when a stream data writing preparation command is received by the memory controller 110.

<<Steps S201 to S206>>

When receiving the "stream data writing preparation command" from the access device 200, the memory controller 110 identifies a logical block corresponding to the designated AU (hereinafter, called a designated logical block), based on the value of the AU address 309 and the size information for the AU set in the register unit 105 (S201). The designated logical block is recognized as a logical block for the stream writing that the access device 200 is ready to perform.

The memory controller 110 then refers to the logical/physical conversion table 132 in the address management unit 106 to check if the designated logical block is registered, so as to determine if a second block is allocated to the designated logical block (S202).

If the designated logical block is registered, the second block is erased by updating the second logical/physical conversion table 132 and putting the second block into an "unregistered" state (S203).

In this embodiment, to erase a block may mean to put the block into such a state in which only dummy data (for example, all the bits are 0 or 1) are read from the block, i.e. a state in which the data in the block are logically erased.

The erased second block is then treated as an unoccupied block in the unoccupied block management table 140 for reuse, after the data in the second block have been logically erased as explained above.

Then, the memory controller 110 determines whether a physical block address for the first block corresponding to the designated logical block has been registered, by referring to the first logical/physical conversion table 131 in the address management unit 106 (S204).

If the physical block address has been registered, the memory controller 110 erases the first block by updating the first logical/physical conversion table 131 and putting the first block into an unallocated state (S205). The erased first block is then treated as an unoccupied block in the unoccupied block management table 140 for reuse, after the data in the first block have been logically erased as explained above.

After an unoccupied block is obtained by referring to the unoccupied block management table 140 and the data is logically erased, the erased physical block is registered as a first block corresponding to the designated logical block in the first logical/physical conversion table 131 and its write flag is set to true (S206).

With the above process, the data previously written in the physical block corresponding to the AU designated by a stream data writing preparation command are logically erased and the newly erased physical block is allocated to the AU, which allows the memory controller 110 to start writing from the very first page of a block.

<1.4.3. Writing Process>

Figure 14:
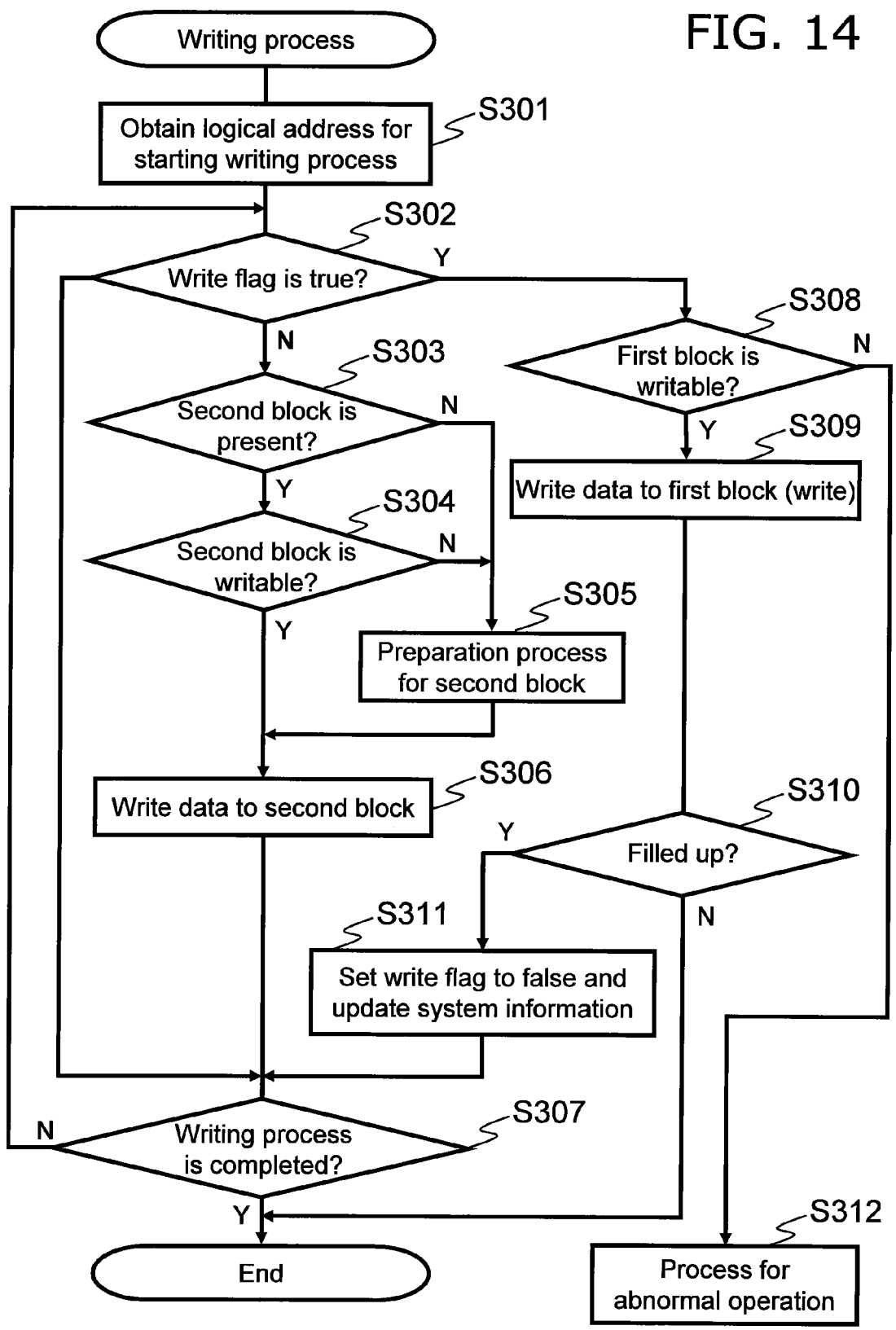
FIG. 14 is a flowchart illustrating the process when a write command and the data to be written according to the write command are received by the nonvolatile memory device according to the first embodiment.

FIG. 14 is a flowchart illustrating the process when a write command and the data to be written according to the write command is received by the memory controller 110.

<<Steps S301 to S312>>

When receiving the "write command" from the access device 200, the memory controller 110 obtains an address for starting the writing process (for each sector) from the argument 304 (S301) and converts the address into a logical block address.

Then, the memory controller 110 refers to the first logical/physical conversion table 131 in the address management unit 106 and checks the write flag for the logical block (hereinafter, called a "designated logical block") (S302).

If the write flag is set to false, the memory controller 110 further refers to the second logical/physical conversion table 132 to determine whether a second block is being allocated to the designated logical block (S303).

If a second block is allocated, the memory controller 110 refers to the second logical/physical conversion table 132 and checks the write state for the second block to determine whether the write data to be transferred from the access device 200 is able to be written to the unwritten pages of the second block (S304).

When the second block is determined to be not allocatable in step S303 or the second block is determined to be not writable in step S304, the memory controller 110 executes a preparation process for a second block to which the write data transferred from the access device 200 is to be written (S305). In this case, the system information block in the nonvolatile memory 120 is updated if needed.

In the process of step S305, an unoccupied entry is prepared in the second logical/physical conversion table 132. If there is no unoccupied entry, such entry is created by cancelling the registration of a registered logical block X in the second logical/physical conversion table 132.

Figure 15:
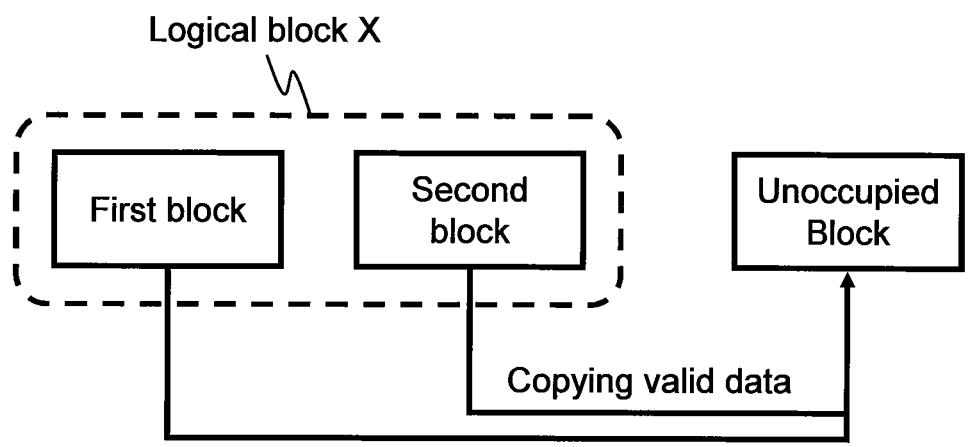
FIG. 15 is a diagram illustrating an example of the states before and after the preparation process for a second block is executed in the first embodiment.
Figure 15:
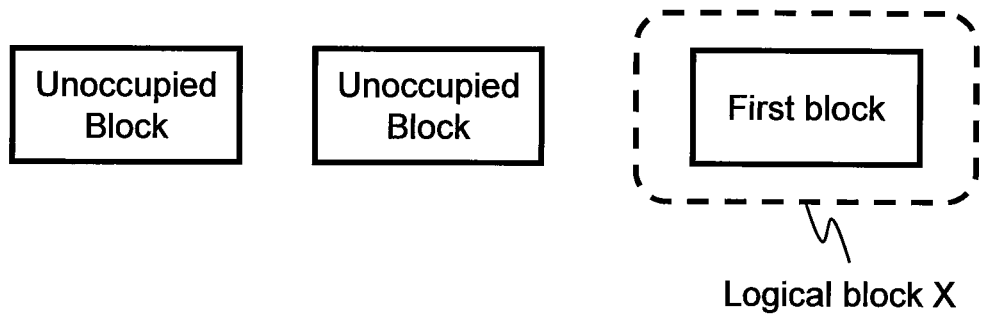

The process for cancelling the registration of a logical block X will be described below with reference to FIG. 15. First, an unoccupied block is obtained based on the unoccupied block management table 140 and the data in the block are logically erased as explained above. Then, from the data written in the first and the second blocks making up the logical block X, the valid data having the size of a single logical block is extracted and copied into the erased unoccupied block. The search for the valid data can be performed by referring to the write states in the second logical/physical conversion table 132, the logical address for each page stored in the control information storage region 124 in each written page of the first or second block, and the like. Then, the block to which the data has been copied is registered as a new first block of the logical block X in the first logical/physical conversion table 131 and the write flag thereof is set to false. Accordingly, the original first block from which the data has been copied is put into an unallocated state in the first logical/physical conversion table 131 and is registered as an unoccupied block in the unoccupied block management table 140 for reuse. Also, the original second block from which the data has been copied is put into an unregistered state in the second logical/physical conversion table 132 and is registered as an unoccupied block in the unoccupied block management table 140 for reuse.

As a result, an unoccupied entry is prepared in the second logical/physical conversion table 132 while the valid data in the logical block X is kept. In this case, it is relatively time-consuming to copy valid data having the size of a single block. For example, it may require 200 to 300 msec, though it depends on the type of the flash memory.

If the memory controller 110 determines that a second block is allocated in step S303 and further determines that the second block is writable in step S304, it proceeds to step S306, where the write data transferred from the access advice 200 is written to the second block (S306).

Upon completion of the writing, the process is ended. On the other hand, if the next data to be written is coming, the memory controller 110 executes the process starting from step S302 with respect to the next logical block (S307).

In step S302, the memory controller 110 refers to the first logical/physical conversion table 131 in the address management unit 106. Then, if the write flag for the designated logical block is true, the memory controller 110 refers to, for example, the logical address for each page stored in the control information storage region 124 in each of the written pages of the first block registered in the first logical/physical conversion table 131. Then, the memory controller 110 determines whether the write data transferred from the access device 200 can be written to the first block or not (S308).

If the first block is writable, the memory controller 110 writes the write data transferred from the access device 200 into the unwritten pages of the first block (S309).

As will be described later, when the access device 200 writes stream data to the first block having a true write flag, the logical addresses are so controlled to be always sequential and thus it is normally determined that the first block is writable in step S308. If the first block is not writable because of some abnormal operation, the memory controller 110 proceeds to the process for abnormal operation (S312) and then ends the process.

After the process in step S309, the memory controller 110 determines whether all the pages of the first block have been filled up with data (S310). If the data writing is completed before all the pages are filled up with data, the process is ended.

If all the pages of the first block have been filled up with data, the write flag in the first logical/physical conversion table 131 is set from true to false and the system information block in the nonvolatile memory 120 is updated as needed (S311).

Then, if the data writing is completed, the process is ended. If there is any data to be written next, the process starting from step S302 is executed with respect to the next logical block (S307).

<1.4.4. Reading Process>

Figure 16:
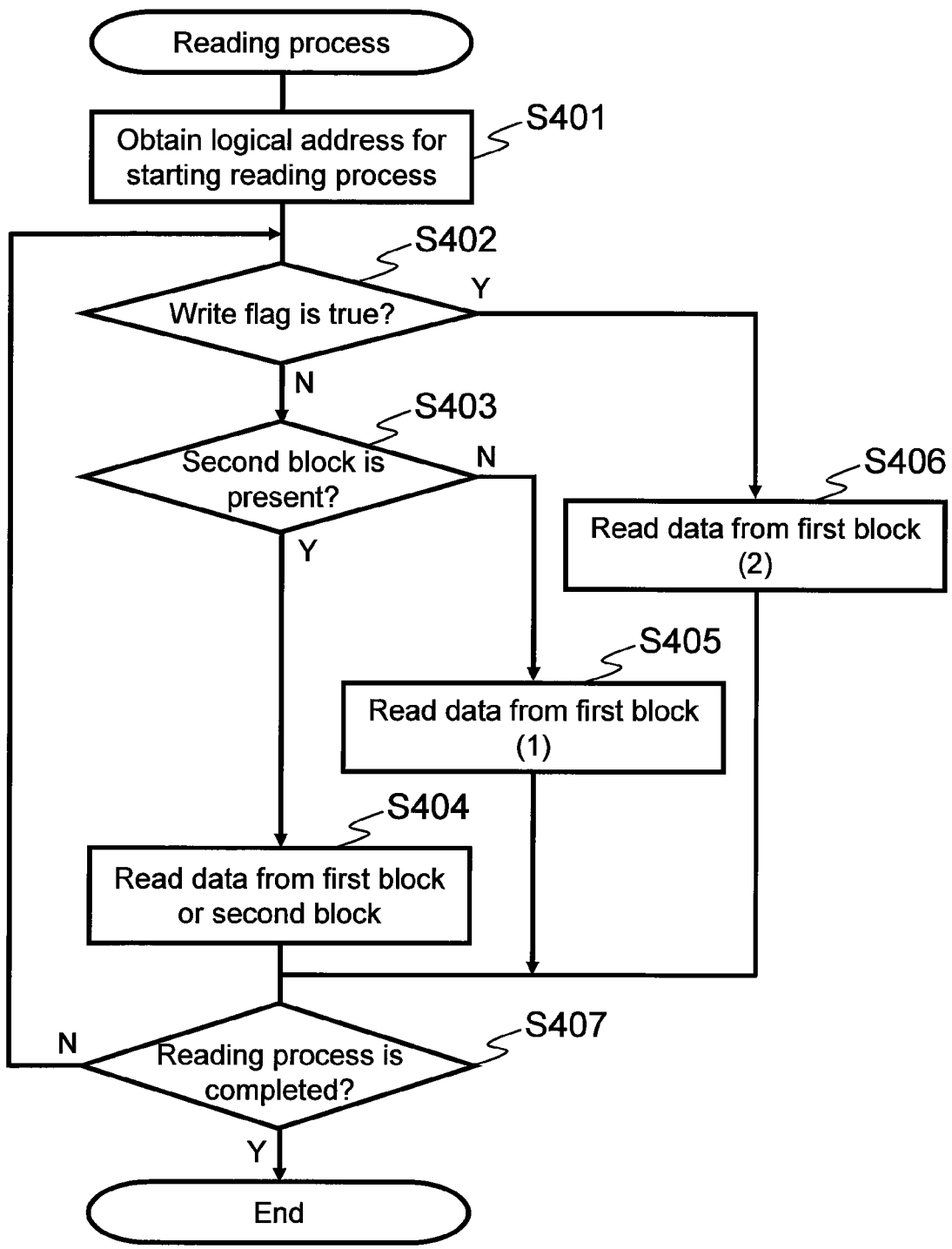
FIG. 16 is a flowchart illustrating the process when a read command is received by the nonvolatile memory device of the first embodiment.

FIG. 16 is a flowchart illustrating the process when a read command is received by the memory controller 110.

<<Steps S401 to S407>>

Upon receiving the "read command" from the access device 200, the memory controller 110 obtains a logical address for starting the reading (for each sector) from the argument 304 and converts the address into a logical block address.

Then, the memory controller 110 refers to the first logical/physical conversion table 131 in the address management unit 106 and checks the write flag for the logical block (S402).

If the write flag is set to false, the memory controller 110 further refers to the second logical/physical conversion table 132 and determines whether a second block is allocated (S403).

If a second block is allocated, the memory controller 110 searches the valid data from the first block registered in the first logical/physical conversion table 131 or the second block, and then transfer the valid data as read data to the access device 200 (S404).

The memory controller 110 searches the valid data by referring to the write state in the second logical/physical conversion table 132, the logical address for each page stored in the control information storage region 122 in each written page of the first or second block, and the like.

If a second block is determined to be not allocated in step S403, the memory controller 110 transfers to the access device 200 the data read from the first block as read data (S405).

If a first block is determined to be not allocated, i.e. there is no data to be read in steps S404 and 405, the memory controller 110 transfer dummy data (for example, all the bits are 0 or 1) as read data. In this embodiment, the unallocated blocks are treated as blocks having logically erased data.

If the write flag is determined to be true in step S402, the memory controller 110 transfers to the access device 200 the data read from the first block registered in the first logical/physical conversion table 131 as read data (S406). If the unwritten pages are read, dummy data (for example, all the bits are 0 or 1) may be transferred as read data.

Then, if the data reading is completed, the process is ended. On the other hand, if there is any data to be read from the next logical block, the process starting from step S402 is executed with respect to the next logical block (S407).

<1.5. Operation of Access Device 200>

The operation of the access device 200 will now be described.

<1.5.1. Initialization Process>

Figure 17:
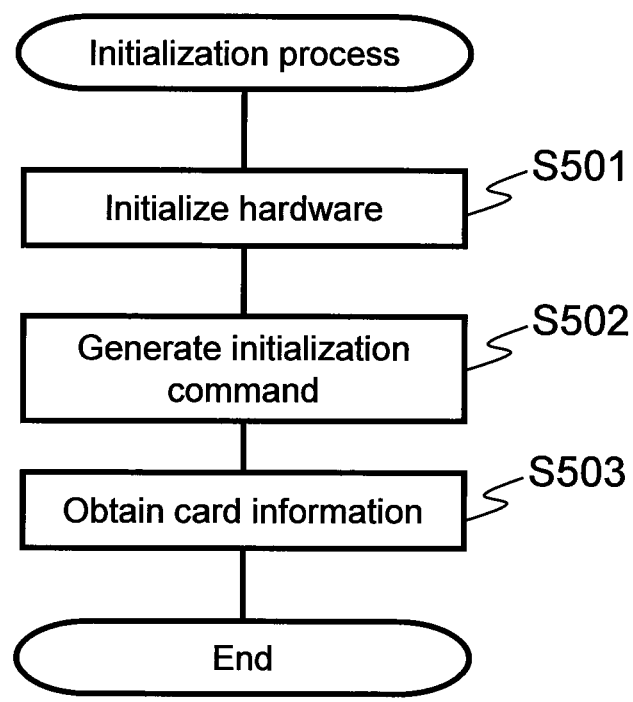
FIG. 17 is a flowchart illustrating the process of initialization executed by the access device of the first embodiment.

FIG. 17 is a flowchart illustrating the process of initialization for the nonvolatile memory device 100 by the access device 200.

<<Steps S501 to S503>>

The access device 200 initializes hardware such as the card interface 204 (S501).

Upon detecting an installation of the nonvolatile memory device 100, the access device 200 powers the nonvolatile memory device 100 on and generates the "initialization command" as described above (S502).

Upon completion of initialization of the nonvolatile memory device 100, the access device 200 obtains information such as the size of an AU stored in the register unit 105 of the nonvolatile memory device 100 via the card interface 204 (S503). Then, the access device 200 reads the control information for the file system stored in the nonvolatile memory device 100 and other information, and prepares for reading and writing processes by the file system.

<1.5.2. Stream Data Writing Process>

Figure 18:
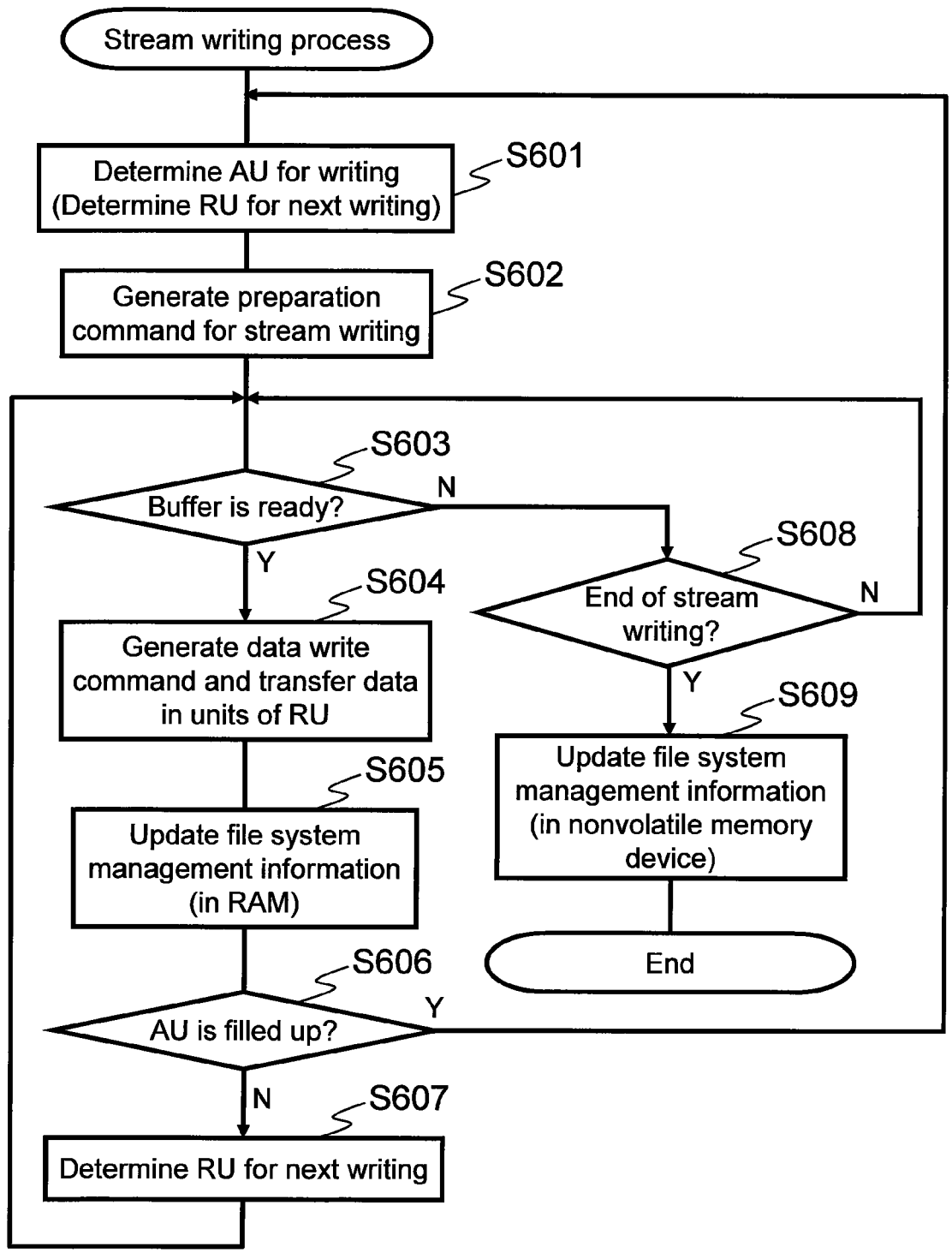
FIG. 18 is a flowchart illustrating the process for stream data writing by the access device of the first embodiment.

FIG. 18 is a flowchart illustrating the process for stream writing by the access device 200. The stream data input from the input unit 202 of the access device 200 is temporarily stored in the buffer 203. Then, after encoded by the encoding unit 207, the stream data is written to the nonvolatile memory device 100 via the card interface 204.

<<Steps S601 to S609>>

First, the access device 200 refers to the control information for the file system and determines an AU for writing stream data (S601). In this embodiment, the access device 200 writes stream data to the AU in the ascending order of RUs. Therefore, if the AU to be written is determined, RUs to be written are also determined.

Then, the access device 200 generates the "stream data write preparation command" for the nonvolatile memory device 100 (S602). The AU address determined in step S601 is applied as the AU address 309 (FIG. 11) of the argument 304. Then, the stream data write preparation process as illustrated in FIG. 13 is executed, and a first block, which is an erased physical block, is allocated to the AU with its write flag being set to true.

The access device 200 determines whether the stream data having the size of an RU is prepared in the buffer 203 (S603).

If the stream data is prepared, the access device 200 generates the "write command" as described above for the nonvolatile memory device 100 and transfers to the nonvolatile memory device 100 the stream data having the size of an RU stored in the buffer 203 (S604). At this time, the logical address for starting the writing as designated in the argument 304 (for each sector) is designated in the order of logical addresses for the AU designated by the "stream data write preparation command". Accordingly, the writing process as illustrated in FIG. 14 is executed and the transferred data of an RU size is written to the first block with the write flag being set to true, from its very first page.

After the process in step S604, the access device 200 updates and puts the file system information stored in a RAM of the system control unit 208 or other memory into the state in which the RU has been filled up with data (S605).

The access device 200 then determines whether the AU has been filled up with the stream data or not (S606).

If the AU has not yet been filled up with the stream data, the access device 200 determines the first RU among the unwritten RUs in the AU as an RU to be written next (S607), and returns to the process in step S603. If the AU has been filled up with data, the access device 200 returns to the process in step S601 to search for an AU to be written next.

In the process in step S603, if the buffer 203 does not yet have data and if the transfer of the stream data is completed (S608), the access device 200 writes to the nonvolatile memory device 100 the file system information stored, for example, in the RAM inside the system control unit 208 (S609) and completes the stream data writing process.

<<Transfer Sequence of Stream Data Writing Process>>

Figure 19:
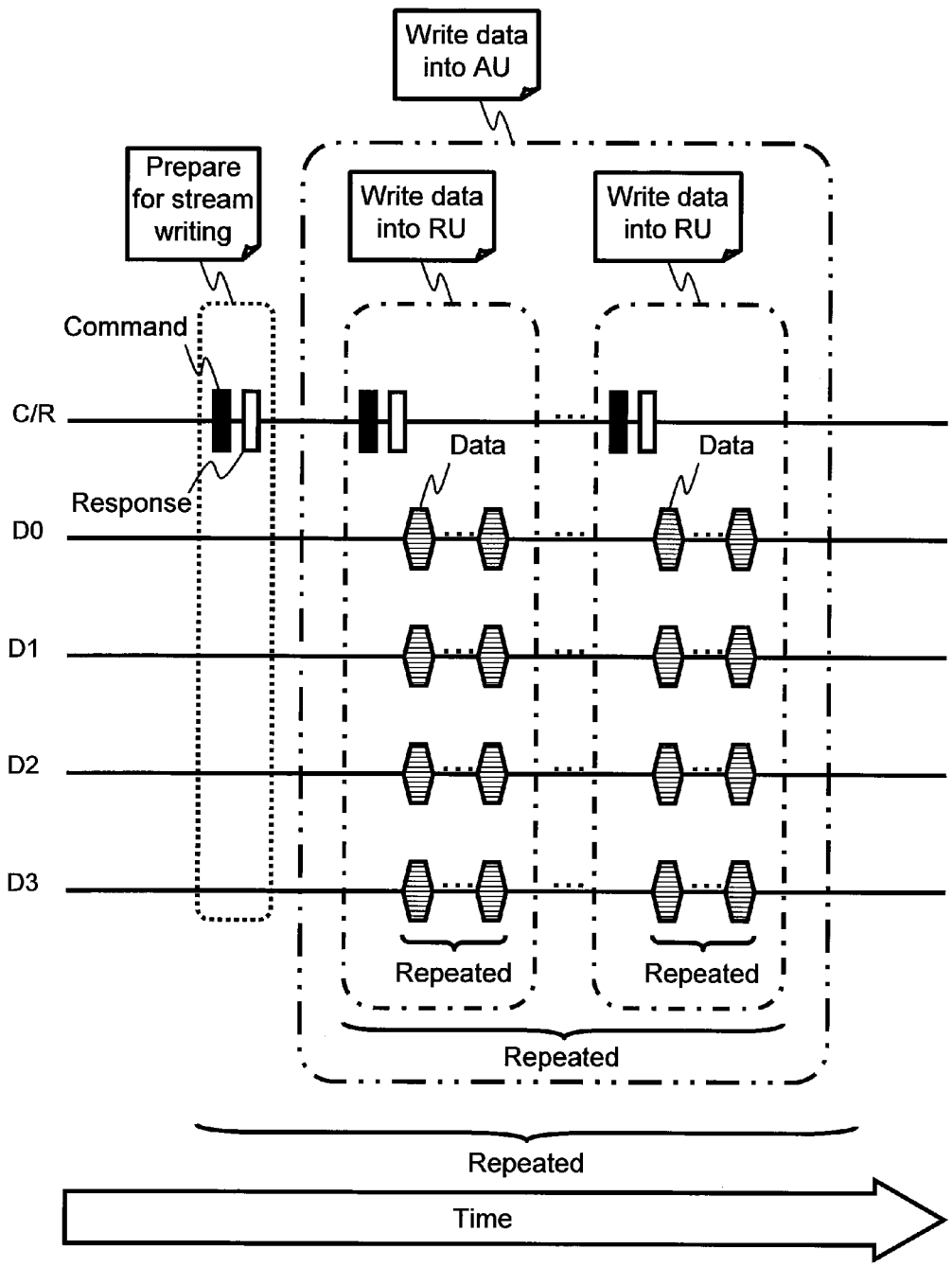
FIG. 19 shows a transfer sequence of command response data when stream data is written in the nonvolatile memory system of the first embodiment.

FIG. 19 illustrates an example of a transfer sequence of command/response/data in the stream data writing process as discussed above.

As illustrated in FIG. 19, there are at least five signal lines arranged between the card IF 204 of the access device 200 and the host IF 101 of the nonvolatile memory device 100, as follows. One is a signal line (C/R) for transferring a response to a command from the access device 200 to the nonvolatile memory device 100 or a command from the nonvolatile memory device 100 to the access device 200. The other four are signal lines (D0, D1, D2, D3) for transferring write or read data between the access device 200 and the nonvolatile memory device 100 in parallel.

In FIG. 19, the time axis extends in a horizontal direction, representing the time advancing from left to right. In the stream data writing process, a stream data write preparation command and its response are first transferred so that an AU to which the stream data is to be written is commonly recognized between the devices. Then, a process of transferring a write command, its response, and the data to be written according to the write command is repeated so that the stream data is written to the AU. When there is another AU to be written to, the process of transferring a stream data write preparation command and the subsequent process are executed again.

Although it is not illustrated here, when the data transfer for writing to RUs is completed, the access device 200 transmits a stop command, in response to which the nonvolatile memory device 100 transmits a response.

<1.5.3. Normal Data Writing Process>

Figure 20:
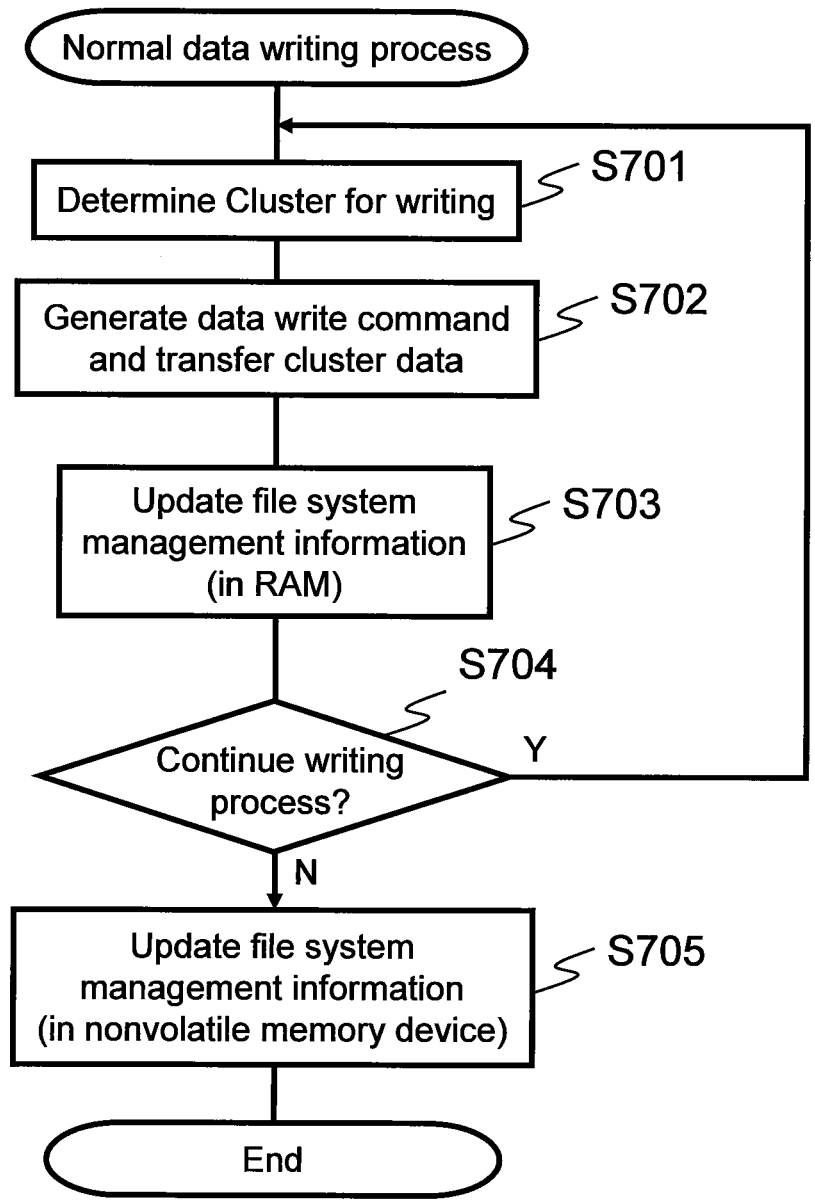
FIG. 20 is a flowchart illustrating the process when normal data is written by the access device of the first embodiment.

FIG. 20 is a flowchart illustrating the process when normal data is written by the access device 200. In this embodiment, the normal data is the data other than stream data, such as control information for the file system, meta data accompanying stream data, the data relating to plural pieces of stream data (for example, playlist) and any other data of relatively small volumes. These pieces of data are kept in, for example, a RAM of the system control unit 208 of the access device 200 and written to the nonvolatile memory device 100 via the card IF 204.

<<Steps S701 to S705>>

The access device 200 refers to the control information for the file system and determines a cluster to which normal data is to be written (S701).

Then, the access device 200 generates the above-described "write command" to the nonvolatile memory device 100 and transfers the data having the size of a cluster stored in, for example, the RAM of the system control unit 208 (S702). Accordingly, the nonvolatile memory device 100 executes the writing process as illustrated in FIG. 14 and writes to a second block the transferred data having the size of a cluster. Depending on the state of the second logical/physical conversion table 132 (FIG. 6), a preparation process for a second block in step S305 (FIG. 14) may be needed. In this case, although the waiting time of about 200 to 300 msec may occur, the data which is previously written and other than the data of a cluster size written this time can be kept unchanged.

After the process in step S702, the access device 200 updates and puts the file system information stored in, for example, the RAM inside the system control unit 208 into a state after the cluster is written (S703).

If there is another data to be written to a next cluster (S704), the access device 200 returns to the process in step S701 and continues the writing process.

If there is no more data to be written to a next cluster, the access device 200 writes to the nonvolatile memory device 100 the file system information stored in, for example, the RAM inside the system control unit 208 (S705) and completes the normal data writing process.

<<Transfer Sequence of Normal Data Writing Process>>

Figure 21:
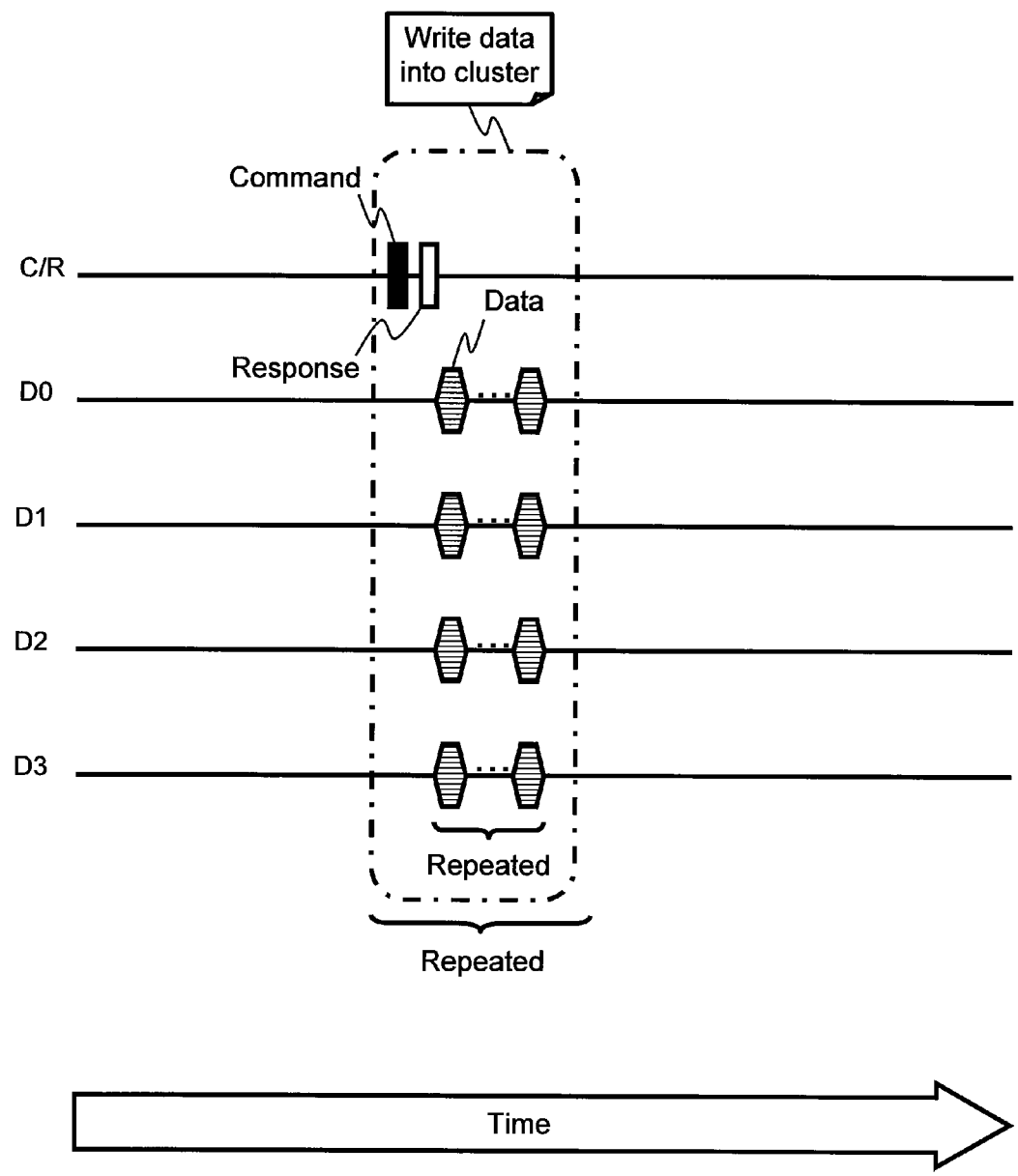
FIG. 21 shows a transfer sequence of command response data when normal data is written in the nonvolatile memory system of the first embodiment.

FIG. 21 shows a transfer sequence of command/response/data when normal data is written. The signal lines between the access device 200 and the nonvolatile memory device 100 in FIG. 21 are the same as those in FIG. 19. In the normal data writing process, a process of transferring a write command, its response and the data written according to the write command is repeated for each cluster. Although it is not illustrated here, when the data transfer for writing to each cluster is completed, the access device 200 transmits a stop command, in response to which the nonvolatile memory device 100 transmits a response.

<1.5.4. Data Reading Process>

Figures 22, 23:
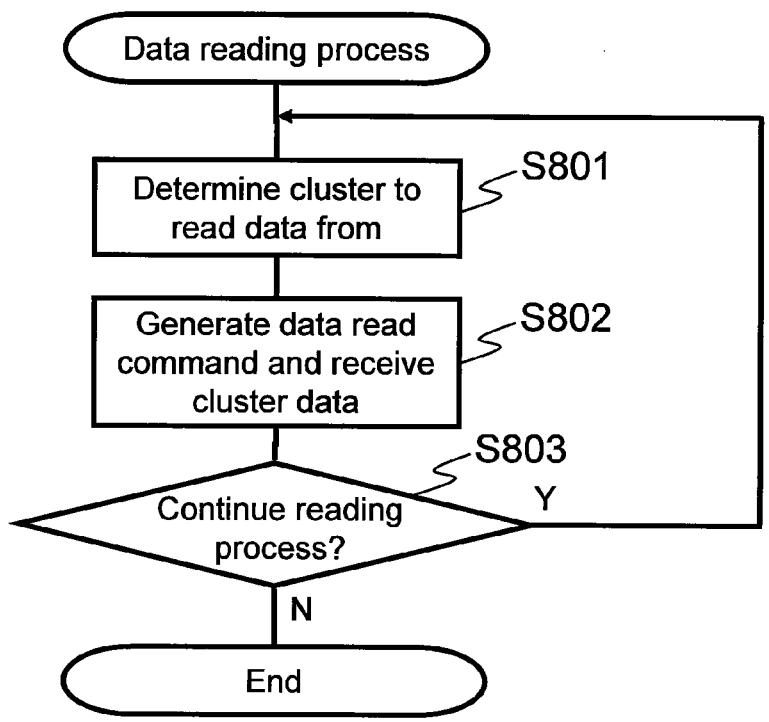
FIG. 22 is a flowchart illustrating the process when data is read by the access device of the first embodiment.
FIG. 23 shows a stream data management table according to a second embodiment of the present invention.

FIG. 22 is a flowchart illustrating the process when data is read by the access device 200. In this data reading process, both stream data and data other than stream data are read in units of cluster.

<<Steps S801 to S803>>

The access device 200 refers to the control information for the file system and determines the cluster from which data is to be read (S801).

Then, the access device 200 generates the "read command" for the nonvolatile memory device 100, receives data from the nonvolatile memory device 100, and stores the received data in, for example, the RAM of the system control unit 208 or the buffer 203 (S802).

The access device 200 returns to the process in step S801 and continues reading if there is a request for reading the next cluster (S803). Otherwise, the access device 200 finishes the process.

<1.6. Effects of First Embodiment>

According to this embodiment, the access device 200 generates the stream data write preparation command when writing the data of a whole block in units of the size smaller than the size of a block, so that the information relating to the address of the block can be sent to the nonvolatile memory device 100 in advance. Accordingly, the nonvolatile memory device 100 needs not copy data for unnecessary arrangements of data and is capable of writing stream data from the very first page of an erased block at a constant rate.

Furthermore, in the stream data write preparation process (FIG. 13), it is determined whether there is a first block or a second block to which the obtained AU address is allocated. If it is allocated, the data in the block is erased and a new block is selected for allocation. Therefore, it is possible to allocate a new block more reliably.

As discussed above, according to this embodiment, it is possible to provide a memory controller, a nonvolatile memory device, an access device, or a nonvolatile memory system that is capable of writing large volumes of content data such as stream data while maintaining a stable writing speed.

Second Embodiment

<2. Configuration of Nonvolatile Memory System 1>

The nonvolatile memory system 1 according to the second embodiment of the present invention does not have a first logical/physical conversion table 131 with write flags provided for the respective logical blocks. Instead, the nonvolatile memory system 1 has a stream data management table 150 in the address management unit 106. The other parts of the second embodiment are the same as those of the first embodiment. Here, the same parts as those of the first embodiment will be described with the same reference numerals and the detailed description for such parts will be omitted below.

<2.1. Stream Data Management Table 150>

FIG. 23 shows an example of the stream data management table 150.

The stream data management table 150 is used for managing the addresses for logical blocks to which the access device 200 writes stream data and the write states of the first blocks corresponding to those logical blocks. The state in which a logical block address is registered in the stream data management table 150 is equated with the state in which the write flag is set to true for the logical block according to the first embodiment.

In the example of FIG. 23, the table is capable of registering the address information for the logical blocks to which stream data is written and the information relating to the write states of the corresponding first blocks (for example, the number of data-written pages) with respect to a maximum of four pieces of stream data.

In the first embodiment, write flags are provided for all the logical blocks in the first logical/physical conversion table 131. In the second embodiment, the stream data management table 150 stores a number of logical block addresses corresponding to the number of pieces of stream data that are written in parallel. Therefore, when the number of pieces of stream data to be written in parallel is not large, the memory used by the address management unit 106 can be reduced.

Furthermore, the stream data management table 150 holds the write states of the first blocks. Accordingly, the nonvolatile memory device 100 during the writing process is able to determine whether the first block is writable in step S308 of FIG. 14 without accessing the nonvolatile memory 120, and therefore makes it possible to speed up the writing.

<2.2. Management for Logical Space by Access Device 200>

The logical space provided by the nonvolatile memory device 100 is managed by the access device 200 in the same manner as in the first embodiment.

<2.2.1. Command Format>

Figure 24:
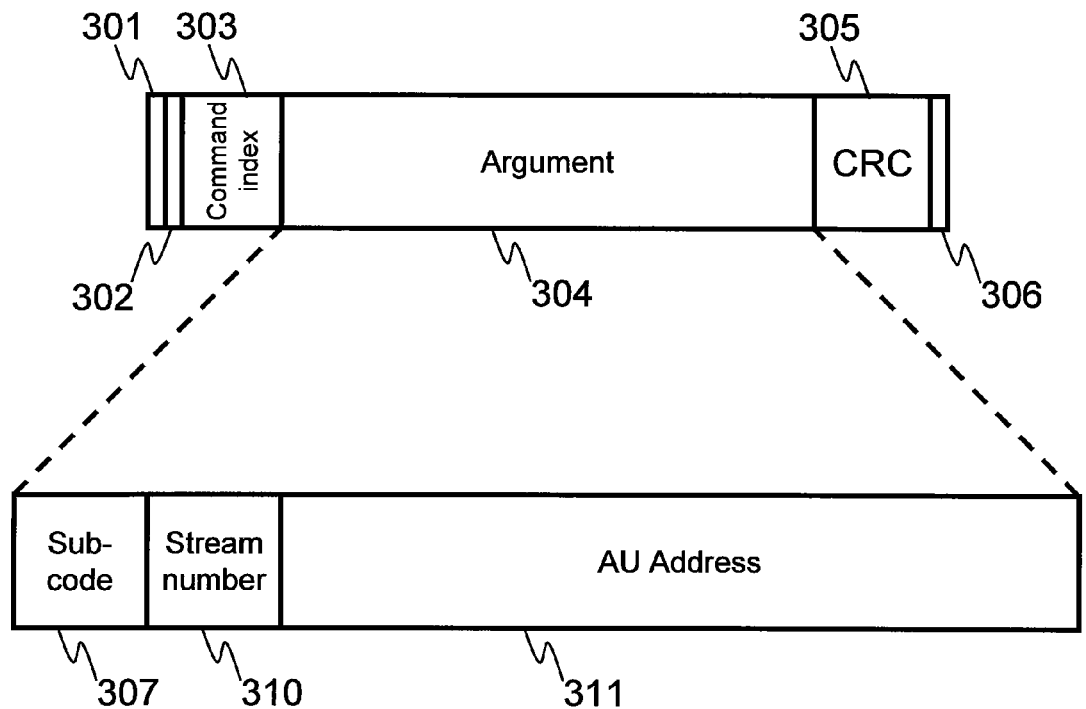
FIG. 24 shows a format of a stream data writing preparation command in the second embodiment.

The format of the "stream data write preparation command" includes a stream number 310 as illustrated in FIG. 24 so that the access device 200 can designate the stream number 310. The rest of the format is the same as that of the first embodiment as illustrated in FIG. 11.

<2.3. Operation of Nonvolatile Memory Device 100>

The nonvolatile memory device 100 of this embodiment operates in a different manner from that of the first embodiment in the following points.

<2.3.1. Stream Data Write Preparation Process>

As for the process of receiving a stream data write preparation command by the memory controller 110 as illustrated in FIG. 13, this embodiment differs from the first embodiment in the following points.

In step S206, the logical block address is registered in the stream data management table 150 instead of setting the write flag to true. The stream number for registration is identical to the number designated by the stream number 310 included in the argument 304.

<2.3.2. Writing Process>

As for the process of receiving a write command and the data to be written according to the write command by the memory controller 110 as illustrated in FIG. 14, this embodiment differs from the first embodiment in the following points.

In step S302, the memory controller 110 determines whether the logical block address is registered in the stream data management table 150 instead of determining whether the write flag is set to true.

In step S311, the memory controller 110 cancels the registration of the logical block address in the stream data management table 150 instead of setting the write flag to false.

<2.3.3. Reading Process>

As for the process of receiving a read command by the memory controller 110 as illustrated in FIG. 16, this embodiment differs from the first embodiment in the following points.

In step S402, the memory controller 110 determines whether the logical block address is registered in the stream data management table 150 instead of determining whether the write flag is set to true.

The operation of the nonvolatile memory device 100 other than the above is substantially the same as that of the first embodiment.

<2.4. Operation of Access Device 200>

In this embodiment, the access device 200 designates a different stream number for each stream data as the stream number 310 when preparing a stream data write preparation command in step S602 of FIG. 18. The other operation is substantially the same as that of the first embodiment.

<2.5. Effects of Second Embodiment>

As discussed above, according to this embodiment, the access device 200 generates the stream data write preparation command when writing the data of a whole block in units of the size smaller than the size of a block, so that the information relating to the address of the block can be sent to the nonvolatile memory device 100 in advance. Accordingly, the nonvolatile memory device 100 needs not copy data for unnecessary arrangements of data and is capable of writing stream data from the very first page of an erased block at a constant rate. Thus, it is possible to provide a memory controller, a nonvolatile memory device, an access device, or a nonvolatile memory system that is capable of writing large volumes of content data such as stream data while maintaining a stable writing speed. Particularly, the memory controller, the nonvolatile memory device, and the nonvolatile memory system according to this embodiment are useful for a semiconductor recording medium using a flash memory for which a larger block is used due to the increase in the volume of data.

This embodiment brings about the following effects in addition to the effects achieved by the first embodiment. According to this embodiment, the stream data management table 150 records a number of logical block addresses corresponding to the number of pieces of stream data to be written in parallel. Accordingly, when the number of pieces of stream data to be written in parallel is not large, the memory used by the address management unit 106 can be reduced. Furthermore, because the stream data management table 150 holds the write states of the first blocks, the nonvolatile memory device 100 is able to determine whether the first blocks can be written to without accessing the nonvolatile memory 120, and therefore, makes it possible to speed up the writing.

Other Embodiments (1)
According to the above-described embodiments and the following embodiments, the first and second blocks are erased when the blocks are to be made unoccupied. Alternatively, the blocks may be abandoned. To abandon a block means to treat the block as an unoccupied block in a logical sense. For example, it may include treating the first or second block as being in an unallocated state. In this case, the data in the block in an unallocated state may be erased, or may remain until new data is written thereto. Or the data may be replaced with some other data such as data that is wholly or partly different from the original data. The data in an abandoned block may include any content and may be either in a normal state or an abnormal state. Such data is read from an abandoned block at the time of reading.

(2)
In the above-described first and second embodiments, the stream data write preparation command (first command) includes an AU address 309 for identifying a write range (first write range) indicated by an AU. However, the present invention should not be limited to this. The stream data write preparation command may not designate an AU address. Instead, the write command (second command) that follows the stream data write preparation command may include an AU address. In this case, the stream data write preparation command may only indicate that the stream data is going to be written, and the write command received subsequent to the stream data write preparation command may include both an AU address and an RU address (identification information for identifying a second write range).

Figure 25:
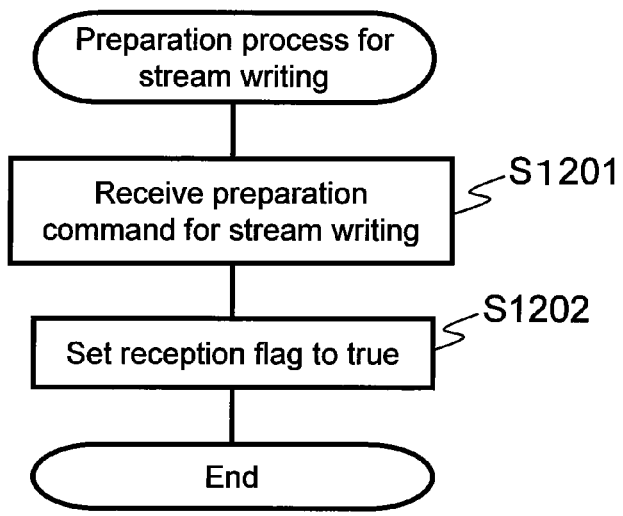
FIG. 25 is a flowchart showing the process when the stream data writing preparation command is received by a nonvolatile memory device according to another embodiment.
Figure 26:
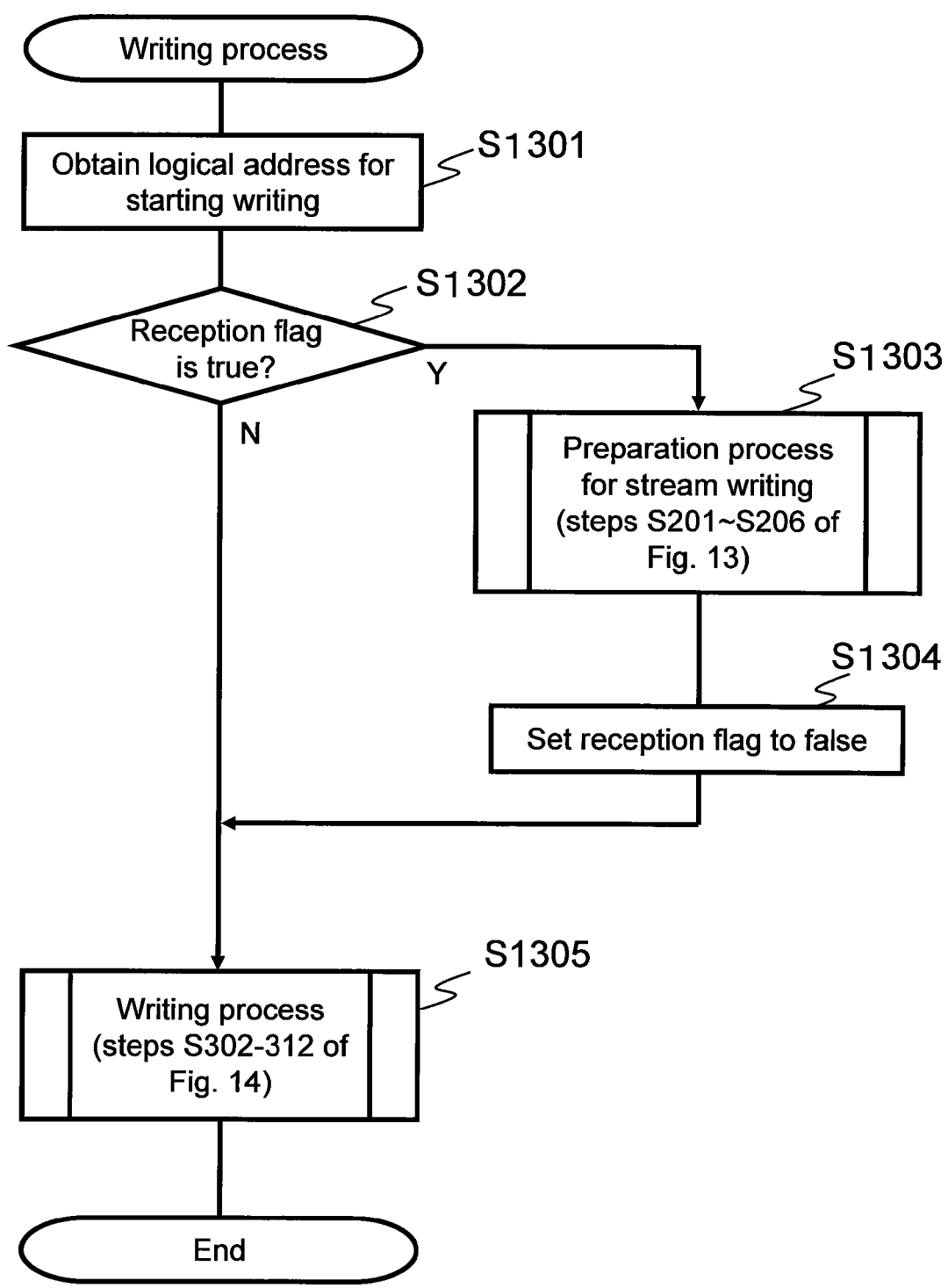
FIG. 26 is a flowchart illustrating the process when a write command and the data to be written according to the write command are received by the nonvolatile memory device according to the embodiment.

According to this embodiment, the processes as illustrated in FIGS. 25 and 26 are executed.

<<Steps S1201 to S1202>>

As illustrated in FIG. 25, the memory controller 110 receives a "stream data write preparation command" from the access device 200 (S1201), and then sets a reception flag to true, which means that the command has been received (S1202).

<<Steps S1301 to S1303>>

Next, as illustrated in FIG. 26, the memory controller 110 receives a "write command" from the access device 200, and then obtains a logical address for starting the writing on a sector-by-sector basis from the argument 304 (S1301), and converts it into a logical block address.

Then, the memory controller 110 determines whether the reception flag for the "stream data write preparation command" is set to true (S1302). If the reception flag is true, the memory controller 110 executes the preparation process for writing stream data (S1303), which is the same as the process of S201 to 206 of FIG. 13. In this case, when the reception flag is true, the received "write command" is the command that has been received after the "stream data write preparation command" in FIG. 25 and includes an AU address. Therefore, the memory controller 110 identifies a logical block corresponding to the designated AU address based on the value of the AU address and the AU size information set in the register unit 105. Then, the designated logical block is identified as a logical block for the subsequent stream writing by the access device 200. Then, the memory controller 110 sets the reception flag to false (S1304).

On the other hand, if the reception flag is false, the memory controller 110 executes the process of steps S302 to 312 as illustrated in FIG. 14 (S1305). In this case, when the reception flag is false, the logical block for stream data writing has already been identified, so normal writing process for each RU is executed.

According to the above-described configuration and process, the memory controller 110 does not erase a logical block at the time of receiving a stream data write preparation command. Instead, the memory controller 110 erases a logical block when a write command is generated. Therefore, even when the process for stream data writing is cancelled after the stream data write preparation command is generated, the data in the AU designated by the stream data write preparation command can be kept.

In the above embodiment, the stream data write preparation command includes a stream number, with which the same process as the second embodiment may be executed.

(3)
The command formats as described in the above embodiments are only examples. Depending on the nonvolatile memory system to be used, the command format may be altered. Furthermore, a single command may be divided into plural commands, or plural commands may be combined into a single command. The same effects can be expected regardless of the command format.

(4)
In the above embodiments, the AU has the same size as a logical block. Alternatively, the AU may be comprised of plural blocks. For example, the AU may be a super block having plural sets of blocks that can be written in parallel. In this case, the unit of super block may be used for a logical address management table or the like. Accordingly, the nonvolatile memory device with a high rate of writing can be achieved.

(5)

In the above embodiment, the written data is erased as illustrated in step S203 or S205, which is the process at the time of the reception of the stream data write preparation command. Alternatively, the erasure of the data may be only reserved in step S203 or S205, and the data may be actually erased at the time of generation of the write command with respect to an AU. Accordingly, even when the process for stream data writing is cancelled after the stream data write preparation command is generated, the data in the AU designated by the stream data write preparation command can be kept.

(6)

In the above embodiment, the response indicating an error is generated as a process for abnormality in step S312 of FIG. 14 to finish the process. Alternatively, the following examples can be applied in order to continue with the writing.

Modification Example 1

All the unwritten pages of the first block are first written with dummy data such as all "0" bits or all "1" bits. After the first block is wholly written, the write flag is set to false. Then, the process returns to step S302. As a result, the previously written data can be kept though the writing rate is temporarily lowered.

Modification Example 2

The first block is first erased. Then, another unoccupied block is erased, allocated as the first block, and written with data. As a result, although the previously written data is erased, the writing rate is prevented from being temporarily lowered.

(7)

In the second embodiment, up to four pieces of stream data can be handled by the stream data management table 150, but the present invention should not be limited to this. It is possible to design the system so that it can handle any number of pieces of stream data.

The present invention should not be limited to the above embodiments and may be altered within the scope of the principle of the present invention. For example, the processes illustrated by flowcharts should not be limited to the above-described ones in terms of order and may be modified within the scope of the principle of the present invention.

INDUSTRIAL APPLICABILITY

The present invention is applicable not only to a semiconductor memory card but also to a still image recording and playback apparatus, a moving image recording and playback apparatus, or a mobile phone in which a nonvolatile memory device such as a semiconductor memory card is used.

REFERENCE NUMERALS

1 Nonvolatile memory system
100 Nonvolatile memory device
101 Host interface (Interface unit)
102 Buffer
103 Read/write control unit
104 CPU
105 Register unit
106 Address management unit
110 Memory controller
120 Nonvolatile memory
121 Block
122 Page
123 Data storage region
124 Control data storage region
131 First logical/physical conversion table
132 Second logical/physical conversion table
140 Unoccupied block management table
150 Stream data management table
200 Access device
201 Input controller unit
202 Input unit
203 Buffer
204 Card Interface
205 Display unit
206 Display control unit
207 Encoding unit
208 System control unit

What is claimed is:

1. A nonvolatile memory device comprises:
   a nonvolatile memory; and
   a memory controller configured to control data writing and reading with respect to the nonvolatile memory, the memory controller including:
   an interface unit configured to receive a first command that identifies a first write range for writing data, and a second command that identifies a second write range that is a part of the first write range identified by the first command and orders to write data to the second write range so as to write the data sequentially from a beginning of the first range identified by the first command; and
   a read/write control unit configured to write data to the nonvolatile memory in response to the second command.

2. The nonvolatile memory device according to claim 1, wherein the first command is a stream data writing preparation command that requires the read/write control unit to perform a stream data writing,
   the second command is a data write command that requires the read/write control unit to write data,
   the first range is defined by the unit of an Allocation Unit, and
   the second range is defined by the unit of a Recording Unit.

3. The nonvolatile memory device according to claim 2, wherein the address management unit determines, before determining a new block, whether one or more blocks have been allocated with respect to the first write range, and abandons the one or more blocks when the one or more blocks have been allocated with respect to the first write range.

4. The nonvolatile memory device according to claim 2, wherein the address management unit determines, before determining a new block, whether one or more blocks have been allocated with respect to the first write range, and erases the one or more blocks when the one or more blocks have been allocated with respect to the first write range.

5. The nonvolatile memory device according to claim 2, wherein the first write range is an integer multiple of the second write range.

6. The nonvolatile memory device according to claim 2, wherein the first command includes at least one piece of second identification information for identifying stream data.

7. The nonvolatile memory device according to claim 6, wherein the address management unit determines a new block for each piece of the second identification information.

8. The nonvolatile memory device according to claim 7, wherein the address management unit stores plural pieces of the second identification information, and the read/write control unit writes data to plural new blocks corresponding to the plural pieces of the second identification information in a parallel manner.

9. The nonvolatile memory device according to claim 1, wherein the address management unit determines, before determining a new block, whether one or more blocks have been allocated with respect to the first write range, and abandons the one or more blocks when the one or more blocks have been allocated with respect to the first write range.

10. The nonvolatile memory device according to claim 1, wherein the address management unit determines, before determining a new block, whether one or more blocks have been allocated with respect to the first write range, and erases the one or more blocks when the one or more blocks have been allocated with respect to the first write range.

11. The nonvolatile memory device according to claim 1, wherein the first write range is an integer multiple of the second write range.

12. The nonvolatile memory device according to claim 1, wherein the first command includes first identification information for identifying the first write range.

13. The nonvolatile memory device according to claim 1, wherein the first command includes at least one piece of second identification information for identifying stream data.

14. The nonvolatile memory device according to claim 13, wherein the address management unit determines the new block for each piece of the second identification information.

15. The nonvolatile memory device according to claim 14, wherein the address management unit stores plural pieces of the second identification information, and the read/write control unit writes data to plural new blocks corresponding to the plural pieces of the second identification information in a parallel manner.

16. An access device that writes and reads data to and from a nonvolatile memory device, the access device being configured to transmit to the nonvolatile memory device a first command that includes identification information for identifying a first write range for writing data, and after transmitting the first command, transmit plural second commands to the nonvolatile memory device, each of the second commands including identification information for identifying a second write range that is a part of the first write range identified by the first command and orders to write data to the second write range so as to write the data sequentially from beginning of the first range identified by the first command.

17. The access device according to claim 16, wherein the first command is a stream data writing preparation command that orders to perform a stream data writing,
the second command is a data write command that orders to write data,
the first range is defined by the unit of an Allocation Unit, and
the second range is defined by the unit of an Recording Unit.

18. A nonvolatile memory system comprises:
a nonvolatile memory device comprising:
a nonvolatile memory; and
a memory controller configured to control data writing and reading with respect to the nonvolatile memory, the memory controller including:
an interface unit configured to receive a first command that identifies a first write range for writing data, and a second command that identifies a second write range that is a part of the first write range identified by the first command and orders to write data to the second write range so as to write the data sequentially from a beginning of the first range identified by the first command;
a read/write control unit configured to write data to the nonvolatile memory in response to the second command; and
the access device according to claim 16.

19. A memory controller that controls data writing and reading to and from a nonvolatile memory, comprising:
an interface unit configured to receive a first command that identifies a first write range for writing data, and a second command that identifies a second write range that is a part of the first write range identified by the first command and orders to write data to the second write range so as to write the data sequentially from a beginning of the first range identified by the first command; and
a read/write control unit configured to write data to the nonvolatile memory in response to the second command.

* * * * *